(12) United States Patent
Fiorentino et al.

(10) Patent No.: US 7,849,121 B2
(45) Date of Patent: Dec. 7, 2010

(54) OPTICAL-BASED, SELF-AUTHENTICATING QUANTUM RANDOM NUMBER GENERATORS

(75) Inventors: Marco Fiorentino, Mountain View, CA (US); Raymond G. Beausoleil, Redmond, WA (US); Charles Santori, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1093 days.

(21) Appl. No.: 11/546,158

(22) Filed: Oct. 10, 2006

(65) Prior Publication Data

US 2008/0065710 A1   Mar. 13, 2008

Related U.S. Application Data

(63) Continuation-in-part of application No. 11/407,513, filed on Apr. 20, 2006.

(51) Int. Cl.
    *G06F 7/58* (2006.01)
(52) U.S. Cl. .................................................. 708/255
(58) Field of Classification Search .......... 708/250–256
    See application file for complete search history.

(56) References Cited

U.S. PATENT DOCUMENTS 7,428,562 B2 * 9/2008 Beausoleil et al. .......... 708/255
2001/0055389 A1 12/2001 Hughes et al.

FOREIGN PATENT DOCUMENTS

JP   2003036168   2/2003

OTHER PUBLICATIONS

Jennewein, Thomas et al—"A Fast and Compact Quantum Random Number Generator"—Review of Scientific Instruments—vol. 71 No. 4—Apr. 4, 2000—pp. 1675-1680.
Hewlett-Packard Development Company, L.P., EP 07775953.8-1229 (co-pending application), Nov. 25, 2009 examination report issued by EPO.

* cited by examiner

*Primary Examiner*—Tan V Mai

(57) ABSTRACT

Various embodiments of the present invention are directed to methods and systems for generating random numbers. In one embodiment, a quantum random number generator comprises: a state generator configured to generate a quantum system in a coherent state; a polarization states analyzer configured to project the quantum system onto one of four different polarization states, and detect each of the four different polarization states; a raw bit generator configured to convert the quantum system into a single photon and detect the single photon in either a first polarization state that corresponds to a first binary number or a second polarization state that corresponds to a second binary number; and a system control configured to receive signals from the polarization states analyzer and the raw bit generator, the signals corresponding to the polarization states, and output a random number based on the first and second polarization states of the single photon.

19 Claims, 23 Drawing Sheets

OPTICAL-BASED, SELF-AUTHENTICATING QUANTUM RANDOM NUMBER GENERATORS

CROSS-REFERENCE TO RELATED APPLICATION

This application is a continuation-in-part of U.S. patent application Ser. No. 11/407,513, filed Apr. 20, 2006.

TECHNICAL FIELD

The present invention relates to random number generators, and, in particular, to methods and systems for generating a sequence of random numbers using quantum mechanical properties of quantum optical systems.

BACKGROUND OF THE INVENTION

Random numbers have applications in numerous areas including game playing, statistical sampling, evaluating integral equations, particle transport calculations, and computations in statistical physics, just to name a few. As a result, random number generators ("RNGs") figure prominently in methods and systems that use random numbers. For example, RNGs are key components of secure systems and are used extensively to generate keys for cryptography. An ideal RNG generates numbers which cannot be predicted in advance and cannot be reliably reproduced. In other words, RNGs ideally generate a sequence of unbiased, random numbers. However, many commonly used RNGs either generate sequences of seemingly random numbers or may be susceptible to generating biased sequences of numbers.

RNGs have been implemented in software to generate sequences of seemingly random numbers using formulas and numerical methods. Software-based RNGs are in general formula-based RNGs and referred to as "pseudorandom number generators," because the formulas allow for prediction and reproduction of a sequence of pseudorandom numbers, provided the same initial parameters are used. A recursive Lehmer pseudorandom number generator ("LPNG") is an example of a commonly used pseudorandom number generator and is given by:

$$x_{n+1} = Ax_n + C (\bmod M)$$

where
   $x_n$ is the nth number of a sequence of random numbers; and
   A, C, and M are parameters that can be adjusted to ensure that a sequence of numbers generated by the LPNG appears random.

Typically, M is assigned the word size of a computer employed to compute a sequence of pseudorandom numbers, and $x_0$, the seed, is assigned a prime number. For example, assigning A, C, and M the values 21, 1, and 32 (5 bits), respectively, and assigning $x_0$ the prime number 13, the LPNG generates the following sequence of pseudorandom integers: 13, 18, 27, 24, 25, 14, 7, etc. Alternative approaches seed a pseudorandom number generator with the time produced by a computer-system clock each time the pseudorandom number generator is initiated. However, even using the time provided by a system clock is not infallible because one can determine the time when the pseudorandom number generator was initiated.

Hardware-based RNGs have also been developed to generate sequences of random numbers from chaotic fluctuations observed in thermal noise generated by atomic, molecular, and electrical systems. For example, thermal noise is generated by an electric current flowing through an electrical conductor, which can be used as a source of a sequence of random numbers by associating numbers with the magnitude of voltage equilibrium fluctuations. The thermal noise occurs whether or not there is an applied voltage because of the random motion of electrons in the conductor. However, hardware-based RNGs are not always reliable sources of sequences of random numbers because the systems employed by the hardware-based RNGs are susceptible to environmental changes. For example, an electric noise-based RNG used to generate a sequence of random numbers can be biased by changing the temperature of the system. In addition, the methods typically employed to authenticate the randomness of the sequence generated by a hardware-based RNG are deterministic software-based methods, which can be used to determine whether the sequences are statistically well-behaved but cannot be used to evaluate the true randomness of the sequence.

Quantum random number generators ("QRNGs") are another type of hardware-based RNG. QRNGs are based on quantum-mechanical properties of identical quantum systems. A sequence of random numbers can be generated by associating each number with the outcome of a measurement performed on a quantum system. The numbers generated in this manner are truly random because each measurement projects the state of a quantum system onto one of many possible states at the time the measurement is performed, and, according to the standard interpretation of quantum mechanics, no amount of refinement of the measurement methods and measuring devices can overcome the uncertainty in the outcome of a measurement performed on a quantum system. As a result, QRNGs are highly desirable systems for generating sequences of random numbers.

Quantum systems comprising just two discrete states, represented by "$|0\rangle$" and "$|1\rangle$," can be used to implement QRNGs. Examples of two-state quantum systems include vertical and horizontal polarization states of an electromagnetic field, two energy states of an atomic system, and the two spin states of an electron or atomic nuclei. A quantum system with two discrete states is called a "qubit system," and the states $|0\rangle$ and $|1\rangle$, called "qubit basis states," can also be represented in set notation as $\{|0\rangle, |1\rangle\}$. A qubit system can exist in the state $|0\rangle$, the state $|1\rangle$, or in any of an infinite number of states that simultaneously comprise both $|0\rangle$ and $|1\rangle$. Any of the states that include both $|0\rangle$ and $|1\rangle$ can be represented mathematically as a linear superposition of states:

$$|\psi\rangle = \alpha|0\rangle + \beta|1\rangle$$

The state $|\psi\rangle$ is called a "qubit," and the parameters $\alpha$ and $\beta$ are complex-valued coefficients satisfying the condition:

$$|\alpha|^2 + |\beta|^2 = 1$$

When $|0\rangle$ and $|1\rangle$ are the two possible states determined by a measurement performed on the qubit system in the state $|\psi\rangle$, one has a probability $|\alpha|^2$ of finding the qubit system in the state $|0\rangle$ and a probability $|\beta|^2$ of finding the qubit system in the state $|1\rangle$. One is said to be performing a measurement on the qubit system in the basis $\{|0\rangle, |1\rangle\}$.

The infinite number of states associated with a qubit system can be geometrically represented by a unit-radius, three-dimensional sphere called a "Bloch sphere":

$$|\psi\rangle = \cos\left(\frac{\theta}{2}\right)|0\rangle + e^{i\phi}\sin\left(\frac{\theta}{2}\right)|1\rangle$$

where
$0 \leq \theta < \pi$, and
$0 \leq \phi < 2\pi$.

FIG. 1 illustrates a Bloch sphere representation of a qubit system. As shown in FIG. 1, lines 101-103 are orthogonal x, y, and z Cartesian coordinate axes, respectively, and a Bloch sphere 106 is centered at the origin. There are an infinite number of points on the Bloch sphere 106, each point representing a unique state of a qubit system. For example, a point 108 on the Bloch sphere 106 represents a unique state of a qubit system that simultaneously comprises, in part, the state $|0\rangle$ and, in part, the state $|1\rangle$. However, once the state of the qubit system is measured in the basis $\{|0\rangle,|1\rangle\}$, the state of the qubit system is projected onto the state $|0\rangle$ 110 or onto the state $|1\rangle$ 112.

FIG. 2 illustrates a hypothetical single polarizing beamsplitter-based QRNG 200. The QRNG 200 comprises a polarizing beamsplitter 202, two photon detectors 204 and 206, and a photon source 208. The beamsplitter 202 comprises a multilayer dielectric thin film 210 sandwiched between two prisms 212 and 214. The beamsplitter 202 has an input channel 216 and two output channels 218 and 220. The channels 216, 218, and 220 represent either optical fibers or free space. The beamsplitter 202 reflects vertically polarized electromagnetic radiation and transmits horizontally polarized electromagnetic radiation. The beamsplitter 202 and photon source 208 can be used to generate a random number as follows. When the photon source 208 outputs a single photon of electromagnetic radiation polarized at 45° to the plane of the beamsplitter 202, the associated coherent linear superposition of states is given by:

$$|45°\rangle = \frac{1}{\sqrt{2}}|V\rangle + \frac{1}{\sqrt{2}}|H\rangle$$

where
$|V\rangle$ represents a vertical polarization state of the photon; and
$|H\rangle$ represents a horizontal polarization state of the photon.

The vertical and horizontal polarization states, $|V\rangle$ and $|H\rangle$, are orthogonal basis states of the single photon polarized at 45° and observing the polarization states $|V\rangle$ and $|H\rangle$ can be associated with the binary numbers "1" and "0," respectively. The photon remains in the state $|45°\rangle$ until the photon is detected at either the photon detector $D_1$ 204 or the photon detector $D_2$ 206. The square of the coefficients of the state $|45°\rangle$ indicates that there is a 1/2 probability of detecting the photon $|V\rangle$ at the detector $D_1$ 204 and a 1/2 probability of detecting the photon $|H\rangle$ at the detector $D_2$ 206. In other words, detecting a photon at the detector 204 can be associated with generating the binary value "1," and detecting a photon at the detector 206 can be associated with generating the binary value "0." Because the probability of detecting either polarization state is 1/2, generating the binary value "0" or "1" is a truly random event.

The QRNG 200 can be used to generate a sequence of random binary numbers which can be partitioned into a sequence of random n-bit words. The sequence of random n-bit words can then be used in a variety of random-number applications. For example, the QRNG 200 can be used to generate a sequence of random integers between 0 and 31 as follows. When a photon $|H\rangle$ is detected by the detector $D_2$ 206, the binary number "0" is added to a sequence of binary numbers, and when a photon $|V\rangle$ is detected by the detector $D_1$ 204, the binary number "1" is added to the same sequence of binary numbers. Suppose that generating the state $|45°\rangle$ 30 times consecutively generates the following sequence of random binary numbers:

00011010101110010101111100100

The sequence of random binary numbers can be partitioned into 5-bit words to give a random sequence of base 2 numbers 00011, 01010, 11100, 10101, 01111, and 00100, which can then be translated into a corresponding sequence of random base 10 integers 3, 10, 28, 21, 15, and 4, respectively.

Although the QRNG 200 appears to offer a convenient method and system for generating a sequence of random numbers, the QRNG 200 may be susceptible to generating sequences of pseudorandom numbers by tampering with the photon source 208. For example, an adversary that acquires control of the photon source 208 can bias the photon source 208 so that the coherent linear superposition of photons output by the photon source 208 are represented by the state:

$$|\chi\rangle = \frac{1}{\sqrt{3}}|V\rangle + \sqrt{\frac{2}{3}}|H\rangle$$

As a result, the QRNG 200 generates a biased sequence of binary numbers where approximately 2/3 of the binary numbers generated equal "0" and approximately 1/3 of the binary numbers generated equal "1." Moreover, the methods typically employed to authenticate the randomness of a sequence generated by a device, such as the QRNG 200, are often deterministic software-based methods, which are unreliable for determining whether or not a sequence of binary numbers is truly random. Physicists, cryptographers, computer scientists, and quantum-information users have recognized a need for QRNGs that can be used to reliably generate sequences of random numbers, and can also detect, authenticate, and correct biases in the sequences of random numbers by QRNGs using methods that rely on the non-deterministic properties of quantum systems.

SUMMARY OF THE INVENTION

Various embodiments of the present invention are directed to methods and systems for generating random numbers. In one embodiment of the present invention, a quantum random number generator comprises: a state generator configured to generate a quantum system in a coherent state; a polarization states analyzer configured to project the quantum system onto one of four different polarization states, and detect each of the four different polarization states; a raw bit generator configured to convert the quantum system into a single photon and detect the single photon in either a first polarization state that corresponds to a first binary number or a second polarization state that corresponds to a second binary number; and a system control configured to receive signals from the polarization states analyzer and the raw bit generator, the signals corresponding to the polarization states, and output a random number based on the first and second polarization states of the single photon.

DETAILED DESCRIPTION OF THE INVENTION

Figure 1:
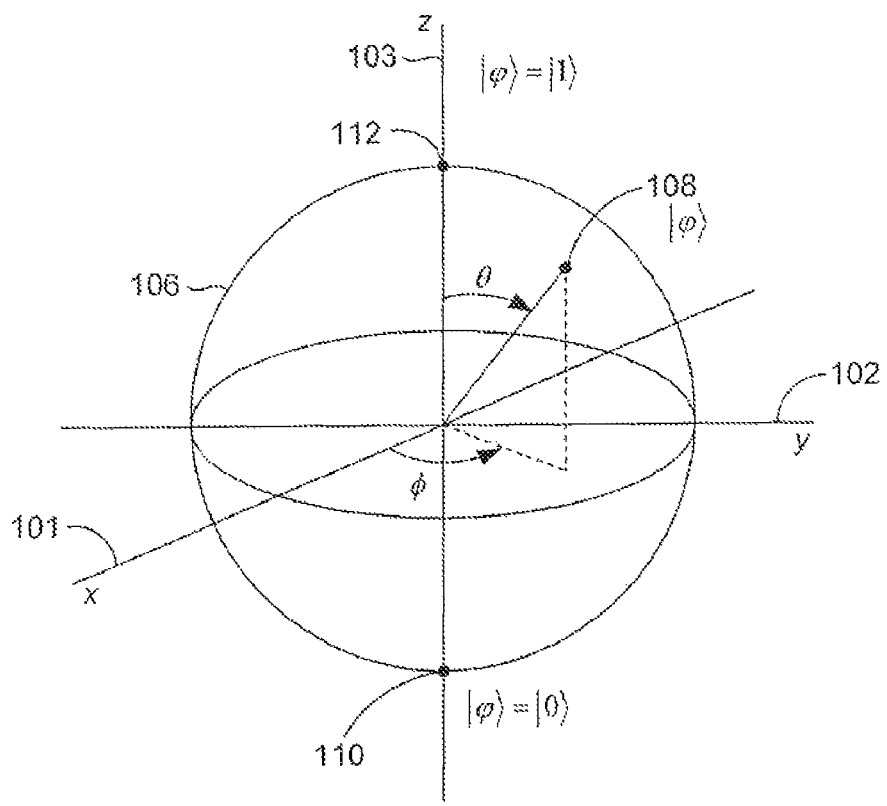
FIG. 1 illustrates a Bloch sphere representation of a qubit system.
Figure 2:
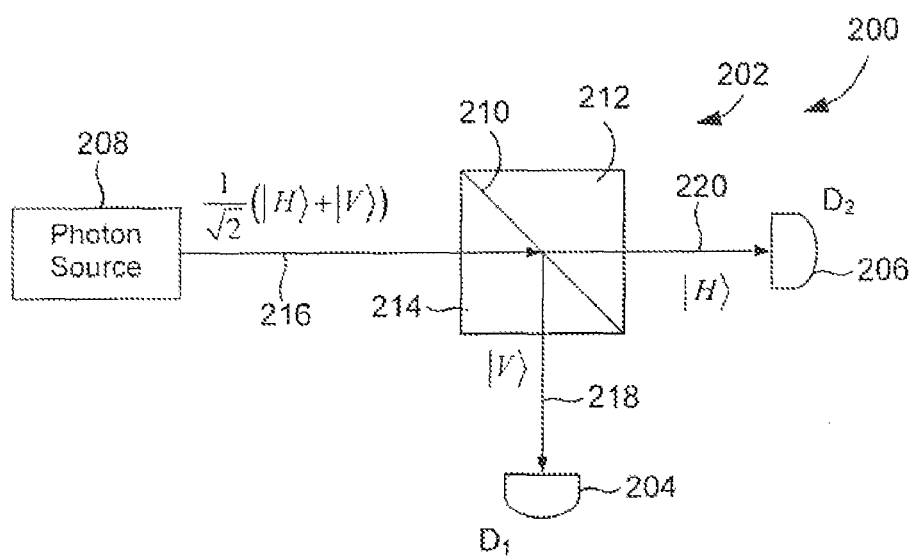
FIG. 2 illustrates a hypothetical single polarizing beam-splitter-based quantum random number generator.

Various embodiments of the present invention are directed to optical-based, self-authenticating QRNGs that can be used to generate a sequence of random binary numbers. Embodiments of the present invention include quantum-mechanical-based methods for evaluating and authenticating the randomness of the sequence and for removing biased binary numbers. Embodiments of the present invention are mathematical in nature and, for this reason, are described below with reference to numerous equations and numerous graphical illustrations. Although mathematical expressions, alone, may be sufficient to fully describe and characterize embodiments of the present invention to those skilled in the art of quantum optics and quantum information, the more graphical, problem oriented examples, and control-flow-diagram approaches included in the following discussion are intended to illustrate various embodiments of the present invention in a variety of different ways so that the present invention may be accessible to readers with various backgrounds. Also, in order to assist the reader in understanding descriptions of various embodiments of the present invention, overview subsections of related topics in physics are provided. In a first subsection, an overview of quantum mechanics is provided. An overview of electromagnetic radiation and quantum optics is provided in a second subsection. An overview of polarization states and Stokes parameters is provided in a third subsection. Finally, various system and method embodiments of the present invention are described in a fifth subsection.

Overview of Quantum Mechanics

Embodiments of the present invention employ concepts in quantum mechanics. The textbook "Quantum Mechanics, Vol. I and II," by Claude Cohen-Tannoudji, Bernard Diu and Frank Laloe, Hermann, Paris, France, 1977, is one of many references for the field of quantum mechanics. In this subsection, topics in quantum mechanics that relate to embodiments of the present invention are described. Additional details can be obtained from the above-referenced textbook, or from many other textbooks, papers, and journal articles related to quantum mechanics.

Quantum mechanics models the observed behavior, atomic and subatomic levels, of systems comprising photons, electrons, atoms, and molecules. Quantum systems exist in discrete states that are characterized by discrete measurable quantities. A state of a quantum system is represented by a ket and is denoted $|\Psi\rangle$, where $\Psi$ is a label that represents a state of a quantum system. For example, an electron has two intrinsic spin-angular-momentum states that correspond to two measurable spin-angular-momentum values $\hbar/2$ and $-\hbar/2$, where $\hbar$ is approximately $1.0546 \times 10^{-34}$ Js. The spin state that corresponds to the spin-angular momentum $\hbar/2$ is referred to as "spin up" and is denoted $|\uparrow\rangle$, and the spin state that corresponds to the spin angular momentum $-\hbar/2$ is referred to as "spin down" and is denoted $|\downarrow\rangle$. Various different labels can be assigned to various different quantum states. For example, the spin up and spin down states $|\uparrow\rangle$ and $|\downarrow\rangle$ can also be represented by the kets $|½\rangle$ and $|-½\rangle$, respectively. Also, a single label can be used to represent different states in entirely different quantum systems. For example, the ket "$|1\rangle$" can represent a first quantized vibrational level of a diatomic molecule and can also be used to represent a single photon, as described below, in a following subsection.

A measurement employed to determine a measurable quantity of a quantum system, such as the spin angular momentum of an electron, is represented by an operator $\hat{\Psi}$, where the symbol "^" denotes an operator. In general, an operator operates on a ket from the left as follows:

$$\hat{\Psi}(|\Psi\rangle) = \hat{\Psi}|\Psi\rangle$$

where $\hat{\Psi}|\Psi\rangle$ is a ket representing an observed quantum state. Typically, an operator $\hat{\Psi}$ is associated with a set of states called "eigenstates." An eigenstate is represented as "$|\psi_i\rangle$" with the following property:

$$\hat{\Psi}|\psi_i\rangle = \psi_i|\psi_i\rangle$$

where
- i is a non-negative integer, and
- $\psi_i$ is a real value, called an "eigenvalue," that corresponds to a discrete measurable quantity that is observed when the quantum system is in the eigenstate $|\psi_i\rangle$ For example, a measurement employed to determine the spin angular momentum of an electron parallel to the z-axis is represented by $\hat{S}_z$, and the eigenvalue-eigenstate representations of observed spin-angular-momentum values are:

$$\hat{S}_z|\uparrow\rangle = \frac{\hbar}{2}|\uparrow\rangle, \text{ and } \hat{S}_z|\downarrow\rangle = -\frac{\hbar}{2}|\downarrow\rangle$$

The eigenstates of an operator are complex vectors that span a complex vector space called a "state space." The eigenstates constitute a basis of the vector space if every state belonging to the state space has a unique linear superposition on the basis. For example, a state $|\Psi\rangle$ in a state space spanned by the N eigenstates $\{|\psi_i\rangle\}$ of an operator $\hat{\Psi}$ the can be written as a linear superposition of the eigenstates as follows:

$$|\Psi\rangle = \sum_{i=1}^{N} c_i|\psi_i\rangle$$

where $c_i$ is a complex valued coefficient called the "amplitude." The state space associated with an operator is also called a "Hilbert space." A Hilbert space includes a mathematical operation called the "inner product." The inner product of two states $|\Psi\rangle$ and $|\Xi\rangle$ is represented by:

$$\langle\Xi|\Psi\rangle$$

where $\langle\Xi|$ is called a "bra," and represents the complex conjugate and transpose of the state $|\Xi\rangle$. The inner product has the following property:

$$\langle\Xi|\Psi\rangle = \langle\Psi|\Xi\rangle^*$$

where "*" represents the complex conjugate. The basis eigenstates of a Hilbert space are orthonormal, or in mathematical notation:

$$\langle\psi_i|\psi_j\rangle = \delta_{ij}$$

where $\delta_{ij}$ is 1 when i equals j, and 0 otherwise. For example, the inner product of the eigenstates of a single electron Hilbert space are:

$$\langle\uparrow|\uparrow\rangle = \langle\downarrow|\downarrow\rangle = 1, \text{ and}$$

$$\langle\uparrow|\downarrow\rangle = \langle\downarrow|\uparrow\rangle = 0$$

The orthonormality property of the eigenstates of a Hilbert space can be used to determine the coefficients of the linear superposition of states $|\Psi\rangle$. Taking the inner product of $|\Psi\rangle$ with $\langle\psi_j|$ gives the corresponding coefficient:

$$\langle\psi_j|\Psi\rangle = \sum_{i=1}^{N} c_i\langle\psi_j|\psi_i\rangle = \sum_{i=1}^{N} c_i\delta_{ij} = c_j$$

Substituting for the coefficients in the linear superposition gives:

$$|\Psi\rangle = \sum_{i=1}^{N} |\psi_i\rangle\langle\psi_i|\Psi\rangle$$

Because $|\Psi\rangle$ is an arbitrary ket in the Hilbert space, $$\sum_{i=1}^{N} |\psi_i\rangle\langle\psi_i| = \hat{1}$$

where "$\hat{1}$" is the identity operator. The summation is called the "completeness relation," and the eigenstates $\{|\psi_i\rangle\}$ are said to be "complete."

The eigenstates of an operator can be represented by orthogonal normalized column vectors and the operator can be represented by a square matrix. For example, the eigenstates of a single electron Hilbert space associated with the operator $\hat{S}_z$ are represented by the column vectors:

$$|\uparrow\rangle \doteq \begin{bmatrix} 1 \\ 0 \end{bmatrix}, \text{ and } |\downarrow\rangle \doteq \begin{bmatrix} 0 \\ 1 \end{bmatrix}$$

where the symbol "$\doteq$" stands for "is represented by." The transposed complex conjugates of the eigenstates are represented by the row vectors:

$$\langle\uparrow| \doteq [1\ 0],$$

and $$\langle\downarrow| \doteq [0\ 1]$$

Using the completeness relation, an operator $\hat{O}$ on the basis $\{|\psi_i\rangle\}$ can also be represented by:

$$\hat{O} = \sum_{i=1}^{N}\sum_{j=1}^{N} |\psi_i\rangle\langle\psi_i|\hat{O}|\psi_j\rangle\langle\psi_j|$$

where $\langle\psi_i|\hat{O}|\psi_j\rangle$ is a matrix element. The matrix corresponding to the operator $\hat{O}$ on the basis $\{|\psi_i\rangle\}$ can be represented as follows:

$$\hat{O} \doteq \begin{bmatrix} \langle\psi_1|\hat{O}|\psi_1\rangle & \langle\psi_1|\hat{O}|\psi_2\rangle & \dots & \langle\psi_1|\hat{O}|\psi_N\rangle \\ \langle\psi_2|\hat{O}|\psi_1\rangle & \langle\psi_2|\hat{O}|\psi_2\rangle & & \vdots \\ \vdots & & \ddots & \\ \langle\psi_N|\hat{O}|\psi_1\rangle & \dots & & \langle\psi_N|\hat{O}|\psi_N\rangle \end{bmatrix}$$

The matrix representation of the operator $\hat{O}$ equal to $\hat{\Psi}$ has zero off diagonal elements, and the diagonal elements are the eigenvalues $\{\psi_i\}$. For example, the electron spin z-axis operator can be given by:

$$\hat{S}_z = \frac{\hbar}{2}\hat{\sigma}_z$$

where $\hat{\sigma}_z = |\uparrow\rangle\langle\uparrow| - |\downarrow\rangle\langle\downarrow|$.

The matrix representation of the electron spin operator $\hat{S}_z$ is given by:

$$\hat{S}_z \doteq \begin{bmatrix} \langle\uparrow|\hat{S}_z|\uparrow\rangle & \langle\uparrow|\hat{S}_z|\downarrow\rangle \\ \langle\downarrow|\hat{S}_z|\uparrow\rangle & \langle\downarrow|\hat{S}_z|\downarrow\rangle \end{bmatrix} = \frac{\hbar}{2}\begin{bmatrix} 1 & 0 \\ 0 & -1 \end{bmatrix}$$

An operator $\hat{O}$ is called a "Hermitian operator" if $\hat{O} = \hat{O}\dagger$ The corresponding matrix elements satisfy the condition:

$\langle\psi_i|\hat{O}|\psi_j\rangle = \rangle\psi_j|\hat{O}\dagger|\psi_i\rangle$ Prior to a measurement corresponding to an operator $\hat{\Psi}$, a quantum system can be thought of as simultaneously existing in all of the eigenstates $\{|\psi_i\rangle\}$ of the operator $\hat{\Psi}$, which is represented by the (pure state) linear superposition of states:

$$|\Psi\rangle = \sum_{i=1}^{N} c_i|\psi_i\rangle = \sum_{i=1}^{N} |\psi_i\rangle\langle\psi_i|\Psi\rangle$$

The measurement corresponding to the operator $\hat{\Psi}$ projects the quantum system initially in the state $|\Psi\rangle$ onto one of the eigenstates $|\psi_i\rangle$. In other words, a measurement on a quantum system is essentially a filtering process that places the state of the quantum system into one of the eigenstates in the linear superposition at the time of the measurement. For example, an electron with an unknown spin orientation prior to a measurement corresponding to the operator $\hat{S}_z$ is represented in a linear superposition of states:

$|\Psi\rangle = c_1|\uparrow\rangle + c_2|\downarrow\rangle$

A spin determination measurement $\hat{S}_z$ projects the state of the electron onto either the state $|\uparrow\rangle$ or the state $|\downarrow\rangle$ at the time of the measurement. In other words, just after the spin determination measurement, the electron is either in the state $|\uparrow\rangle$ or the state $|\downarrow\rangle$.

There is a corresponding irreversible change to the state of a quantum system as a result of a measurement. Irreversibility can only be avoided when the quantum system is already in one of the quantum states before the measurement is performed. As a result, one cannot infer the prior state of a quantum system based on the outcome of a single measurement. For example, if the outcome of a spin measurement is $\hbar/2$, it is not possible to determine whether the system was already in the state $|\uparrow\rangle$ or in a linear superposition of the spin states $|\uparrow\rangle$ and $|\downarrow\rangle$ at the time of the measurement.

Although it is not possible to know in advance which of the various states $|\psi_i\rangle$ the state of a quantum system will be projected onto, the probability of the quantum system being found in a particular state $|\psi_i\rangle$ immediately after the measurement is given by:

$Pr(\psi_i) = |c_i|^2 = \langle\psi_i|\Psi\rangle^2$ where $|\Psi\rangle$ is normalized, and $|c_i|^2$ equals $c^*_i c_i$ and gives the outcome probability. For example, prior to a spin determination measurement in the spin basis $\{|\uparrow\rangle, |\downarrow\rangle\}$, consider an electron coherently prepared with a 1/2 probability of being found in the spin state $|\uparrow\rangle$ and a 1/2 probability of being found in the spin state $|\downarrow\rangle$. The state associated with the electron in such as spine state prior to a spin determination measurement can be represented by:

$$|\Psi\rangle = \frac{1}{\sqrt{2}}|\uparrow\rangle + \frac{1}{\sqrt{2}}|\downarrow\rangle$$

The expectation value of a measurement performed on a quantum system that is represented by the linear superposition of states $|\Psi\rangle$ is mathematically represented by:

$\langle\hat{\Psi}\rangle = \langle\Psi|\hat{\Psi}|\Psi\rangle$ and is determined by applying the completeness relation as follows:

$$\langle\hat{\Psi}\rangle = \sum_{i=1}^{N}\sum_{j=1}^{N}\langle\Psi|\psi_i\rangle\langle\psi_i|\hat{\Psi}|\psi_j\rangle\langle\psi_j|\Psi\rangle = \sum_{i=1}^{N}\psi_i|\langle\psi_i|\Psi\rangle|^2$$

The expectation value represents the weighted eigenvalue average result expected from measurements on the quantum systems in the ensemble, where the initial state $|\Psi\rangle$ of the quantum system is the same for each member of the ensemble. In other words, the linear superposition of states representing each quantum system is identical prior to the measurement. In practice, such an ensemble could be realized by preparing many identical and independent quantum systems all in the same state, or by repeatedly preparing a single system in the same state. Note that the expectation value may not be the value obtained for each measurement and, therefore, is not to be confused with the eigenvalue obtained from the measurement. For example, the expectation value of $\hat{S}_z$ can be any real value between the eigenvalues $\hbar/2$ and $-\hbar/2$, but the actual measured value of $\hat{S}_z$ for an electron is always either $\hbar/2$ or $-\hbar/2$ in each individual measurement.

The expectation value of a single quantum system in a state $|\Psi\rangle$ can also be described using a density operator defined by:

$\hat{\rho} = |\Psi\rangle\langle\Psi|$ where the state $|\Psi\rangle$ is also called a "pure state," which is distinguished from a statistical mixture of states described below. The density operator is represented in the $\{|\psi_i\rangle\}$ basis by a matrix called the "density matrix" whose matrix elements are:

$$\rho_{ij} = \langle \psi_i | \hat{\rho} | \psi_j \rangle = c_i^* c_j$$

The density operator characterizes the state of the quantum system. In other words, the density operator provides all the physical information that can be calculated from the state $|\Psi\rangle$. For example, the sum of the diagonal matrix elements of the density matrix is given by:

$$\sum_i |c_i|^2 = \sum_i \rho_{ii} = Tr(\rho) = 1$$

where Tr represents the trace, or sum of the diagonal elements, of a matrix. For example, the density matrix of a two-state quantum system in the pure state:

$$|\Psi\rangle = c_1 |\psi_1\rangle + c_2 |\psi_2\rangle$$

is given by:

$$\rho = \begin{bmatrix} c_1 c_1^* & c_1 c_2^* \\ c_2 c_1^* & c_2 c_2^* \end{bmatrix}$$

where the diagonal elements are the probabilities associated with projecting the quantum system into either the state $|\psi_1\rangle$ or the state $|\psi_2\rangle$, and the off-diagonal elements represent the interference effects between the states $|\psi_1\rangle$ and $|\psi_2\rangle$. In addition, the expectation value of a quantum system in the state $|\Psi\rangle$ can be expressed as:

$$\langle \hat{\Psi} \rangle = \sum_{i,j} \langle \psi_j | \Psi \rangle \langle \Psi | \psi_i \rangle \langle \psi_i | \hat{\Psi} | \psi_j \rangle$$
$$= \sum_{i,j} \langle \psi_j | \hat{\rho} | \psi_i \rangle \langle \psi_i | \hat{\Psi} | \psi_j \rangle$$
$$= Tr\{\hat{\rho} \hat{\Psi}\}$$

However, it is often the case that information about a quantum system is incomplete. For example, a quantum system can be in any one of the states $|\Psi_1\rangle, |\Psi_2\rangle, |\Psi_3\rangle, \ldots$, each with an associated probability $p_1, p_2, p_3, \ldots$, where the probabilities satisfy the conditions:

$$0 \le p_1, p_2, p_3, \ldots \le 1, \text{ and } \sum_i p_i = 1$$

The quantum system is said to exist in a "statistical mixture of states." The density operator for a statistical mixture of states can be determined as follows. As described above, the probability that a measurement of the observable $\hat{\Psi}$ on a quantum system in the pure state $|\Psi_i\rangle$ yields a result $\psi_n$ is:

$$Pr_i(\psi_n) = \langle \Psi_i | \psi_n \rangle \langle \psi_n | \Psi_i \rangle = |\langle \psi_n | \Psi_i \rangle|^2$$

However, the probability $Pr_i(\psi_n)$ of observing $\psi_n$ in a statistical mixture of states is weighted by $p_i$ and the summed over $i$ to give:

$$Pr(\psi_n) = \sum_i p_i Pr_i(\psi_n)$$
$$= \sum_i p_i \langle \psi_n | \Psi_i \rangle \langle \Psi_i | \psi_n \rangle$$
$$= \langle \psi_n | \hat{\rho} | \psi_n \rangle$$
$$\hat{\rho} = \sum_i p_i |\Psi_i\rangle \langle \Psi_i |$$

is the density operator associated with a statistical mixture of states. The associated density matrix elements are given by:

$$\rho_{np} = \langle \psi_n | \sum_i p_i |\Psi_i\rangle\langle\Psi_i| | \psi_p \rangle$$
$$= \sum_i p_i c_n^{(i)} c_p^{(i)*}$$

The physical meaning of the density matrix is described for a two-state quantum system comprising a mixture of states:

$$|\Psi_i\rangle = c_1^{(i)} |\psi_1\rangle + c_2^{(i)} |\psi_2\rangle$$

The corresponding density matrix is given by:

$$\rho = \begin{bmatrix} \rho_{11} & \rho_{12} \\ \rho_{21} & \rho_{22} \end{bmatrix} = \begin{bmatrix} \sum_i p_i c_1^{(i)} c_1^{(i)*} & \sum_i p_i c_1^{(i)} c_2^{(i)*} \\ \sum_i p_i c_2^{(i)} c_1^{(i)*} & \sum_i p_i c_2^{(i)} c_2^{(i)*} \end{bmatrix}$$

The diagonal matrix elements can be interpreted to mean that when the state of the quantum system is $|\Psi_i\rangle$, the diagonal matrix element $\rho_{11}$ represents the average probability of finding the quantum system in the state $|\psi_1\rangle$, and the diagonal matrix element $\rho_{22}$ represents the average probability of finding the quantum system in the state $|\psi_2\rangle$. When the same measurement is carried out N times under identical conditions, $N\rho_{11}$ will be found in the state $|\psi_1\rangle$ and $N\rho_{22}$ will be found in the state $|\psi_2\rangle$. The off-diagonal elements $\rho_{12}$ and $\rho_{21}$ express the average interference effects between the states $|\psi_1\rangle$ and $|\psi_2\rangle$. Note that unlike the diagonal matrix elements, the off-diagonal matrix elements can be zero even though neither of the products $$c_1^{(i)} c_2^{(i)*} \text{ and } c_2^{(i)} c_1^{(i)*}$$

is zero, which means that the average over N measurements has cancelled out the interference effects of the states $|\psi_1\rangle$ and $|\psi_2\rangle$.

A tensor product is a way of combining Hilbert spaces of different quantum systems to form Hilbert spaces that represent combined quantum systems. For example, $H_\Psi$ is a Hilbert space of a first quantum system, and $H_\Xi$ is a Hilbert space of a second quantum system. The Hilbert space denoted by $H_\Psi \otimes H_\Xi$ represents a combined Hilbert space, where the symbol ⊗ represents a tensor product. The operators $\hat{\Psi}$ and $\hat{\Xi}$ correspond to the Hilbert spaces $H_\Psi$ and $H_\Xi$, respectively, and each operates only on the corresponding eigenstates as follows:

$$(\hat{\Psi} \otimes \hat{\Xi})(|\psi\rangle \otimes |\xi\rangle) = (\hat{\Psi}|\psi\rangle) \otimes (\hat{\Xi}|\xi\rangle)$$

where $|\psi\rangle$ represents a state in the Hilbert space $H_\Psi$, and $|\xi\rangle$ represents a state in the Hilbert space $H_\Xi$. The tensor product $|\psi\rangle \otimes |\xi\rangle$ can be abbreviated as $|\psi\rangle|\xi\rangle$, $|\psi,\xi\rangle$, or $|\psi\xi\rangle$. For example, the spin states of two electrons in an atomic orbital are bases for a combined Hilbert space. The two electrons can either both be spin up, both be spin down, the first electron spin up and the second electron spin down, or the first electron spin down and the second electron spin up. The various tensor product representations of two spin up electrons are given by:

$$|\uparrow\rangle \otimes |\uparrow\rangle_2 = |\uparrow\rangle_1|\uparrow\rangle_2 = |\uparrow,\uparrow\rangle_2 = |\uparrow\uparrow\rangle_2$$

where the subscripts 1 and 2 refer to the first and second electrons.

In quantum mechanics, there are also measurable quantities with continuous eigenvalue spectrums. The dimensionality of the corresponding Hilbert spaces are infinite and many of the properties described above for discrete quantum systems can be generalized for continuous quantum systems. A continuous eigenvalue equation is:

$$\hat{\zeta}|\zeta\rangle = \zeta|\zeta\rangle$$

where $\zeta$ represents a continuous eigenvalue, and the ket $|\zeta\rangle$ is a continuous eigenstate of the operator $\hat{\zeta}$. For example, for an unbound particle in one dimension, both position q and momentum p are continuous eigenvalues of the position and momentum operators $\hat{q}$ and $\hat{p}$, respectively, and can assume any real value between $-\infty$ and $\infty$.

The properties of the continuous variable $\zeta$ can be generalized as follows:

$$\langle \zeta | \zeta' \rangle = \delta(\zeta - \zeta'), \int_{-\infty}^{\infty} d\zeta |\zeta\rangle\langle\zeta| = 1, \text{ and } \langle \zeta|\hat{\zeta}|\zeta'\rangle = \zeta'\delta(\zeta - \zeta'),$$

where $\delta(\zeta-\zeta')$ is the delta function, which has numerous limit representations, such as $$\delta(\zeta - \zeta') = \lim_{\Delta \to 0} \frac{1}{\sqrt{2\pi\Delta^2}} \exp\left(-\frac{(\zeta - \zeta')^2}{2\Delta^2}\right)$$

A state ket for an arbitrary physical state can be expanded in terms of the states $\{|\zeta\rangle\}$ as follows:

$$|\alpha\rangle = \int_{-\infty}^{\infty} d\zeta |\zeta\rangle\langle\zeta|\alpha\rangle$$

For example, consider placing in the path of a particle a detector that outputs the position of the particle when the particle is at the position q. Immediately after the measurement is taken, the system, initially in the state $|\alpha\rangle$, is projected onto the state represented by $|q\rangle$ in much the same way an arbitrary electron-spin state is projected onto one of the two spin states when a spin detection measurement is performed. Other properties of the continuous variable $\zeta$ are given by:

$$\int_{-\infty}^{\infty} d\zeta |\langle \zeta | \alpha \rangle|^2 = 1, \text{ and}$$

$$\langle \beta | \alpha \rangle = \int_{-\infty}^{\infty} d\zeta \langle \beta | \zeta \rangle \langle \zeta | \alpha \rangle$$

The momentum operator $\hat{p}$ can also be represented by a differential operator $-i\hbar\partial/\partial q$. As a result, both the position and momentum operators satisfy the canonical commutation relations:

$$[\hat{q}_i, \hat{q}_j] = 0$$

$$[\hat{p}_i, \hat{p}_j] = 0, \text{ and}$$

$$[\hat{q}_i, \hat{p}_j] = i\hbar \delta_{ij}$$

where
i and j represent orthogonal coordinates, such as the Cartesian x, y, and z coordinates, and
the commutator is defined as $[A,B] = AB - BA$.

An Overview of Electromagnetic Radiation and Quantum Optics

In this subsection, a brief description of electromagnetic radiation and quantum optics that relates to embodiments of the present invention is described. Quantum optics is a field of physics that relates the application of quantum mechanics to electromagnetic radiation. Electromagnetic radiation confined to a cavity with perfectly reflecting walls is quantized. Quantized electromagnetic radiation can be applied to more general unconfined optical systems, such as electromagnetic radiation propagating in free space or in an optical fiber.

Electromagnetic radiation confined to a cavity, with no free charges and currents, comprises an electric field component $\overline{E}(\overline{r},t)$ and a magnetic field component $\overline{B}(\overline{r},t)$ that are related in terms of a vector potential $\overline{A}(\overline{r},t)$ satisfying the wave equation:

$$\nabla^2 \overline{A} - \frac{1}{c^2}\frac{\partial^2 \overline{A}}{\partial t^2} = 0$$

and the Coulomb, non-relativistic gauge condition:

$$\nabla \cdot \overline{A}(\overline{r},t) = 0$$

where the electric and magnetic field components are determined by:

$$\overline{E}(\overline{r},t) = \frac{\partial \overline{A}(\overline{r},t)}{\partial t}, \text{ and}$$

$$\overline{B}(\overline{r},t) = \nabla \times \overline{A}(\overline{r},t)$$

Figure 3:
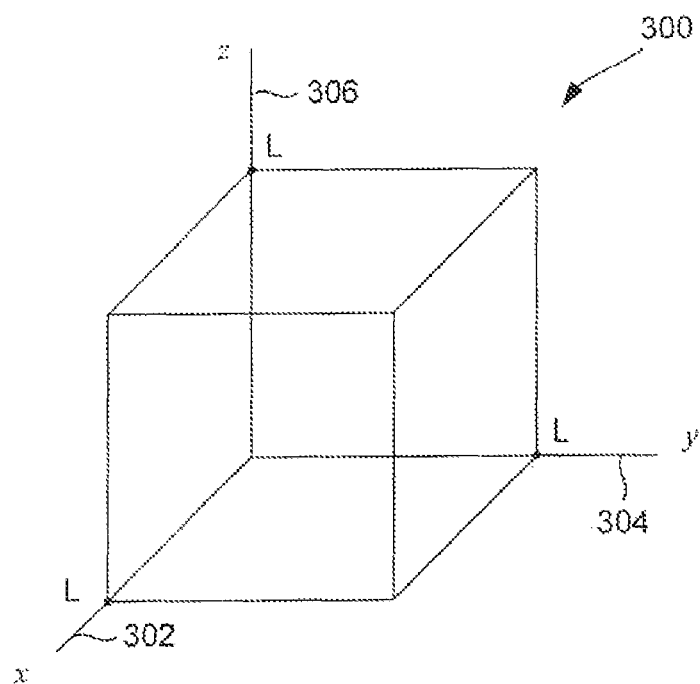
FIG. 3 illustrates a cubic cavity.

The electromagnetic radiation is assumed to be propagating and is subject to periodic boundary conditions imposed by a cubic, or quantization, cavity with perfectly reflecting walls, where the walls are of length L. FIG. 3 illustrates a cubic cavity 300. Orthogonal axes 302, 304, and 306 represent the x, y, and z Cartesian coordinate axes. The finite dimensional cubic cavity 300 imposes periodic boundary conditions on solutions to the wave equation. For example, in the x, y, and z-directions, plane wave solutions to the vector potential wave equation satisfy the condition:

$$\exp(i\bar{k}\cdot\bar{r})=\exp(i\bar{k}\cdot(\bar{r}+\bar{L}))$$

where $\bar{L}$ is vector (L, L, L), and
$\bar{k}$ is called the "wavevector" with components:

$$\bar{k} = \frac{2\pi}{L}(m_x, m_y, m_z), \text{ and}$$

$m_x$, $m_y$, and $m_z$ are integers.

Each set of integers ($m_x$, $m_y$, $m_z$) specifies a normal mode of the electromagnetic radiation, and the magnitude of the wavevector $\bar{k}$, k, is equal to $\omega_k/C$, where c represents the speed of light in free space and $\omega_k$ is the angular frequency. Note that in real life the spectrum of normal modes of an electromagnetic field is actually continuous and a discrete spectrum of normal modes suggested by the wavevector $\bar{k}$ is an approximation to the continuous spectrum.

A propagating vector potential solution to the wave equation above that satisfies the periodic boundary conditions is:

$$A(r,t) = \sum_{\bar{k},s} \bar{e}_{\bar{k}s}\left(A_{\bar{k}s}e^{i(\bar{k}\cdot\bar{r}-\omega_k t)} + A_{\bar{k}s}^* e^{-i(\bar{k}\cdot\bar{r}-\omega_k t)}\right)$$

where $A_{\bar{k}s}$ is a complex amplitude of the electromagnetic radiation;
$\bar{e}_{\bar{k}s}$ represents two unit-length polarization vectors; and
$m_x$, $m_y$, $m_z$=0, ±1, ±2, ±3, . . . .

The sum over $\bar{k}$ represents the sum over the integers ($m_x$, $m_y$, $m_z$), and the sum over s is the sum over the two independent polarizations that are associated with each $\bar{k}$. The two polarization vectors are orthogonal as indicated by:

$$\bar{e}_{\bar{k}s}\cdot\bar{e}_{\bar{k}s'}\delta_{ss'},$$

and from the gauge condition given above:

$$\bar{k}\cdot\bar{e}_{\bar{k}s}=0,$$

for both polarization directions s. The two polarization vectors $\bar{e}_{\bar{k}1}$ and $\bar{e}_{\bar{k}2}$ form a right-handed coordinate system with a normalized wavevector given by:

$$\bar{e}_{\bar{k}1} \times \bar{e}_{\bar{k}2} = \frac{\bar{k}}{|\bar{k}|} = \bar{\kappa}$$

Figure 4:
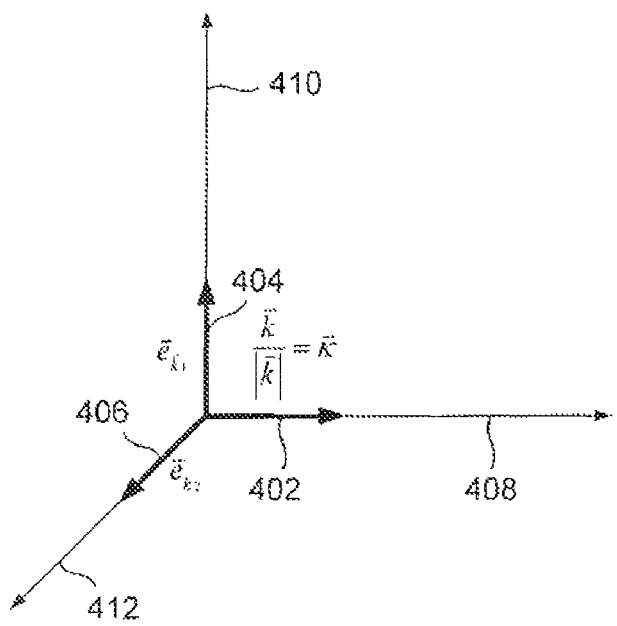
FIG. 4 illustrates a three-dimensional coordinate system with two independent polarization vectors and a normalized wavevector as basis vectors.

FIG. 4 illustrates a three-dimensional right-handed coordinate system with two independent polarization vectors $\bar{e}_{\bar{k}s}$ and a normalized wavevector $\bar{\kappa}$ as basis vectors. In FIG. 4, the wavevector $\bar{\kappa}$ 402, and the polarization vectors, $\bar{e}_{\bar{k}1}$ 404 and $\bar{e}_{\bar{k}2}$ 406, are three orthogonal unit length basis vectors of a coordinate system with coordinate axes represented by lines 408, 410, and 412, respectively.

The propagating electric and magnetic field components of the vector potential are:

$$\bar{E}(\bar{r},t) = i\sum_{\bar{k},s} \omega_k \bar{e}_{\bar{k}s}\left[A_{\bar{k}s}e^{i(\bar{k}\cdot\bar{r}-\omega_k t)} - A_{\bar{k}s}^* e^{-i(\bar{k}\cdot\bar{r}-\omega_k t)}\right], \text{ and}$$

$$\bar{B}(\bar{r},t) = \frac{i}{c}\sum_{\bar{k},s} \omega_k (\bar{\kappa} \times \bar{e}_{\bar{k}s})\left[A_{\bar{k}s}e^{i(\bar{k}\cdot\bar{r}-\omega_k t)} - A_{\bar{k}s}^* e^{-i(\bar{k}\cdot\bar{r}-\omega_k t)}\right]$$

Both the electric field $\bar{E}(\bar{r},t)$ and magnetic field $\bar{B}(\bar{r},t)$ are propagating wave solutions referred to as the "classical" representation of the electric and magnetic field, are orthogonal to one another, and are both orthogonal to the wavevector $\bar{k}$.

Figure 5:
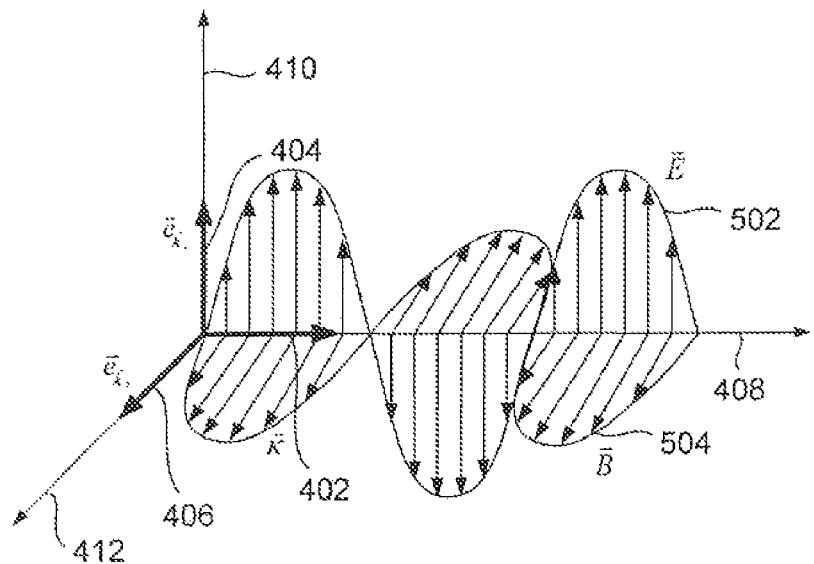
FIG. 5 illustrates a representation of electric and magnetic field components of electromagnetic radiation in the coordinate system shown in FIG. 4.

FIG. 5 illustrates a representation of electric and magnetic field components of electromagnetic radiation in the right-handed coordinate system shown in FIG. 4. The electromagnetic radiation is directed along the wavevector $\bar{\kappa}$ 402 axis. The electric field component $\bar{E}(\bar{r},t)$ 502 and magnetic field component $\bar{B}(\bar{r},t)$ 504 are directed along the orthogonal polarization vectors $\bar{e}_{\bar{k}1}$ 404 and $\bar{e}_{\bar{k}2}$ 406, respectively, and appear frozen at a particular time t.

The energy of the electromagnetic radiation can be determined by evaluating the Hamiltonian:

$$H = \frac{1}{2}\int_V \left(\varepsilon_0 \bar{E}\cdot\bar{E} + \frac{1}{\mu_0}\bar{B}\cdot\bar{B}\right)dV = 2\varepsilon_0 V \sum_{\bar{k},s} \omega_k^2 A_{\bar{k}s} A_{\bar{k}s}^*,$$

where $\epsilon_0$ is the electric permittivity of free space,
$\mu_0$ is the magnetic permeability of free space, and
V is the volume of the cavity.

electric permittivity $\epsilon_0$ represents the degree to which a vacuum space can store electrical potential energy under the influence of an electric field, and the magnetic permeability $\mu_0$ represents the degree to which the vacuum modifies the flux of a magnetic field. In a non-conducting medium, the electric permittivity is further multiplied by $\epsilon$, which is the degree to which the medium enhances the storage of electrical potential energy, and the magnetic permeability is further multiplied by $\mu$, which is the degree to which the medium further enhances the flux of a magnetic field.

In order to quantize the electric field $\bar{E}(\bar{r},t)$ and magnetic field $\bar{B}(\bar{r},t)$ components, the canonical variables for position, $q_{\bar{k}s}$, and momentum, $p_{\bar{k}s}$, are introduced into the Hamiltonian by setting:

$$A_{\bar{k}s} = \frac{1}{2\omega_k\sqrt{\varepsilon_0 V}}(\omega_k q_{\bar{k}s} + ip_{\bar{k}s})$$

As a result, the Hamiltonian for the electromagnetic radiation becomes:

$$H = \frac{1}{2}\sum_{\bar{k},s}(p_{\bar{k}s}^2 + \omega_k^2 q_{\bar{k}s}^2)$$

Each term in the Hamiltonian is the energy of a harmonic oscillator with vibrational mode $\bar{k}s$, where the term $$p_{\bar{k}s}^2/2$$

is the kinetic energy, and the term $$\omega_k q_{\bar{k}s}^2/2$$

is the potential energy of a harmonic oscillator with a unit mass. The Hamiltonian is quantized by replacing the position and momentum variables $q_{\bar{k}s}$ and $p_{\bar{k}s}$ with quantum mechanical position and momentum operators $\hat{q}_{\bar{k}s}$ and $\hat{p}_{\bar{k}s}$, respectively, to give the quantum Hamiltonian operator:

$$\hat{H} = \frac{1}{2}\sum_{\bar{k},s}(\hat{p}_{\bar{k}s}^2 + \omega_k^2 \hat{q}_{\bar{k}s}^2)$$

Annihilation and creation operators are defined by:

$$\hat{a}_{\bar{k}s} = \frac{1}{\sqrt{2\hbar\omega_k}}(\omega_k \hat{q}_{\bar{k}s} + i\hat{p}_{\bar{k}s}), \text{ and}$$

$$\hat{a}_{\bar{k}s}^\dagger = \frac{1}{\sqrt{2\hbar\omega_k}}(\omega_k \hat{q}_{\bar{k}s} - i\hat{p}_{\bar{k}s}),$$

and substituting the annihilation and creation operators in the quantum Hamiltonian operator gives:

$$\hat{H} = \sum_{\bar{k},s} \hbar\omega_k \left(\hat{a}_{\bar{k}s}^\dagger \hat{a}_{\bar{k}s} + \frac{1}{2}\right),$$

where $$\hat{a}_{\bar{k}s}^\dagger \hat{a}_{\bar{k}s}$$

is called the "number operator" and is also denoted by $\hat{n}_{\bar{k}s}$. Using the canonical commutation relations for the position and momentum operators, the annihilation and creation operators satisfy the commutation relations given by:

$$[\hat{a}_{\bar{k}s}, \hat{a}_{\bar{k}'s'}] = 0 = [\hat{a}_{\bar{k}s}^\dagger, \hat{a}_{\bar{k}'s'}^\dagger], \text{ and } [\hat{a}_{\bar{k}s}, \hat{a}_{\bar{k}'s'}^\dagger] = \delta_{\bar{k}\bar{k}'}\delta_{ss'}.$$

When the electromagnetic radiation is quantized, the amplitudes $A_{\bar{k}s}$ become operators:

$$\hat{A}_{\bar{k}s} = \sqrt{\frac{\hbar}{2\omega_k \varepsilon_0 V}}\, \hat{a}_{\bar{k}s},$$

which can be substituted in the classical electric and magnetic field equations above to obtain electric and magnetic field operators:

$$\hat{E}(\bar{r},t) = i\sum_{\bar{k},s} \sqrt{\frac{\hbar\omega}{2\varepsilon_0 V}}\, e_{\bar{k}s}\left[\hat{a}_{\bar{k}s}e^{i(k\cdot r - \omega_k t)} - \hat{a}_{\bar{k}s}^\dagger e^{-i(k\cdot r - \omega_k t)}\right], \text{ and}$$

$$\hat{B}(\bar{r},t) = \frac{i}{c}\sum_{\bar{k},s}(\bar{\kappa} \times e_{\bar{k}s})\sqrt{\frac{\hbar\omega}{2\varepsilon_0 V}}\, e_{\bar{k}s}\left[\hat{a}_{\bar{k}s}e^{i(k\cdot r - \omega_k t)} - \hat{a}_{\bar{k}s}^\dagger e^{-i(k\cdot r - \omega_k t)}\right]$$

Both the electric and magnetic field operators are Hermitian and represent measurable electric and magnetic fields.

The electric field accounts for most of the interactions with charged matter, because the magnitude of the magnetic field is smaller than the electric field by the factor 1/c. As a result, the electric field alone is generally used to characterize the behavior of electromagnetic radiation and any interactions with charged matter, and the magnetic field component can be ignored.

Quantum computation and quantum information processing systems can be operated using a single-mode $\bar{k}s$ of electromagnetic radiation. As a result, the Hamiltonian operator for a single-mode of electromagnetic radiation reduces to:

$$\hat{H} = \hbar\omega\left(\hat{a}^\dagger \hat{a} + \frac{1}{2}\right),$$

where $\hat{a}$ and $\hat{a}^\dagger$ replace the mode-dependent operators $\hat{a}_{\bar{k}_j s_j}$ and $$\hat{a}_{\bar{k}_j s_j}^\dagger$$

in the Hamiltonian above. The eigenstates and the corresponding energy eigenvalues of the single-mode Hamiltonian are:

$$\hat{H}|n\rangle = \hbar\omega\left(\hat{a}^\dagger \hat{a} + \frac{1}{2}\right)|n\rangle = E_n|n\rangle,$$

where $|n\rangle$ is called a "number state," n is a nonnegative integer called a "photon number," and $E_n$ is an energy eigenvalue.

The annihilation and creation operators operate on a number state as follows:

$$\hat{a}|n\rangle = \sqrt{n}|n-1\rangle,$$

$$\hat{a}^\dagger|n\rangle = \sqrt{n+1}|n+1\rangle, \text{ and}$$

$$\hat{n}|n\rangle = n|n\rangle,$$

where $\hat{n}$ represents the operator $\hat{a}^\dagger\hat{a}$ and is called the "number operator." The number states can be generated by repeated application of the annihilation and creation operators to the number states. For example, repeated application of the annihilation operator to a number state lowers the photon number:

$$|0\rangle = \frac{\hat{a}^n}{\sqrt{n!}}|n\rangle,$$

where $|0\rangle$ is called the "vacuum state" and represents the lowest energy state of the electromagnetic radiation. Beginning with the vacuum state, and repeatedly applying the creation operator gives:

$$|n\rangle = \frac{(\hat{a}^\dagger)^n}{\sqrt{n!}}|0\rangle$$

The number states are orthogonal and form a compete set represented by:

$$\langle n'|n\rangle = \delta_{n'n}, \text{ and}$$

$$\sum_{n=0}^{\infty} |n\rangle\langle n| = 1$$

In general, the energy eigenvalue equation associated with a number state $|n\rangle$ is:

$$\hat{H}|n\rangle = \hbar\omega\left(n + \frac{1}{2}\right)|n\rangle = E_n|n\rangle.$$

Applying the annihilation and creation operators to the energy eigenvalue equation gives:

$$\hat{H}(\hat{a}|n\rangle) = \hbar\omega\left(n - \frac{1}{2}\right)|n-1\rangle = (E_n - \hbar\omega)|n-1\rangle, \text{ and}$$

$$\hat{H}(\hat{a}^\dagger|n\rangle) = \hbar\omega\left(n + \frac{3}{2}\right)|n+1\rangle = (E_n + \hbar\omega)|n+1\rangle,$$

which shows that the energy levels of electromagnetic radiation are equally spaced by a quantum of energy $\hbar\omega$. In other words, the excitations of electromagnetic radiation occur in discrete amounts of energy $\hbar\omega$ called "photons." The photon number n refers to the number of photons $\hbar\omega$ comprising the electromagnetic radiation.

Figure 6:
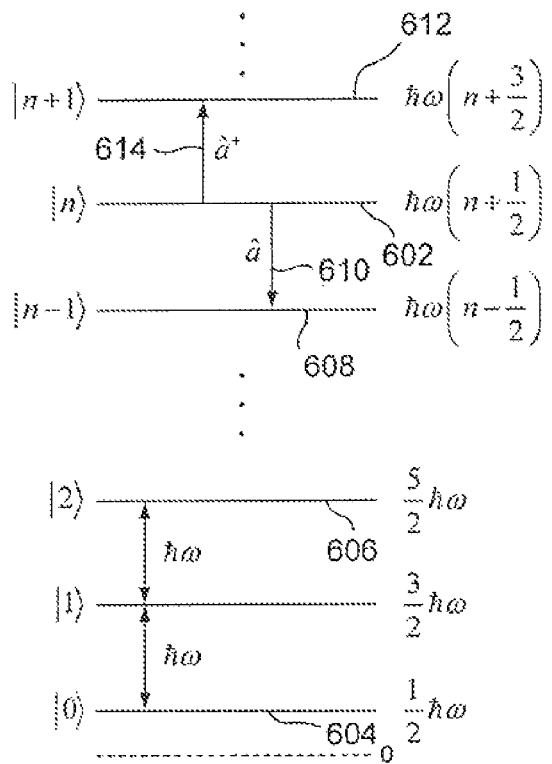
FIG. 6 is an energy-level diagram of quantized electromagnetic radiation.

FIG. 6 is an energy level diagram of quantized electromagnetic radiation. Horizontal lines, such as horizontal line 602, represent energy levels of electromagnetic radiation. Energy level 604 is the lowest energy level, which corresponds to the vacuum state $|0\rangle$. The energy of the vacuum state is $\hbar\omega/2$ or ½ the energy of a single photon. Higher energy levels of electromagnetic radiation are each separated by the same quantum of energy $\hbar\omega$. For example, the energy level 606 represents electromagnetic radiation with a total electromagnetic energy of 5 $\hbar\omega/2$, which can be thought of as the energy of two photons plus the vacuum state energy $\hbar\omega/2$. The annihilation operator corresponds to removal of a photon from the electromagnetic radiation, and the creation operator corresponds to addition of a photon to the electromagnetic radiation. For example, the annihilation operator $\hat{a}$ represents an electromagnetic-radiation transition 610 from the state $|n\rangle$ 602 to the lower energy state $|n-1\rangle$ 608. The transition 610 is achieved by giving up a photon to the surroundings. By contrast, the creation operator $\hat{a}^\dagger$ represents an electromagnetic-radiation transition 614 from the state $|n\rangle$ 602 to the higher energy state $|n+1\rangle$ 612. The transition 614 is achieved by accepting a photon from the surroundings. Note that typically the surroundings can be an atom, a quantum dot, or any other system that couples to the field through a dipole interaction. Loss or absorption of a photon will involve a simultaneous excitation of the surrounding system and creation or emission of a photon will involve a corresponding de-excitation of the surrounding system.

Photons can be generated by a photon source and transmitted through free space or in an optical fiber. The photon source can be a pulsed laser that generates a single pulse or a train of pulses, each pulse containing one or more photons that all have the same optical properties, such as wavelength and direction. Photons with the same optical properties are called "coherent." However, the source, the detector, and a medium, such as an optical fiber, separating the source from the detector do not define an optical cavity. The source and the detector are parts of a continuous unidirectional flow of optical energy with no significant reflection or recycling of the optical energy. A pulse transmitted through free space or an optical fiber is described by a wavepacket that can be represented by a time-dependent, Gaussian-shaped function given by:

$$\xi(t) = \left(\frac{2\Delta^2}{\pi}\right)^{1/4} \exp\{-i\omega_0 t - \Delta^2(t_0 - t)^2\},$$

where
$\omega_0$ is the central frequency of the pulse spectrum,
t is time,
$t_0$ is the time at which the peak of the wavepacket is located at a distance $z_0$ from the photon source, and
$\Delta^2$ is the variance of the intensity spectrum.

The time $t_0$ can be determined by $z_0/v$, where v is the velocity of the pulse traveling through free space or in an optical fiber.

The wavepacket $\xi(t)$ is the amplitude of the pulse, and $|\xi(t)|^2$ is a photodetection probability density function of the pulse, where the photodetection probability density function $|\xi(t)|^2$ satisfies the normalization condition:

$$\int_{-\infty}^{\infty} dt |\xi(t)|^2 = 1$$

The probability of photodetection of a photon in the time interval $(t_1, t_2)$ at a distance $z_0$ from the photon source is given by:
Probability of $$(t_1 < t_2) = \int_{t_1}^{t_2} dt |\xi(t)|^2$$

Figure 7:
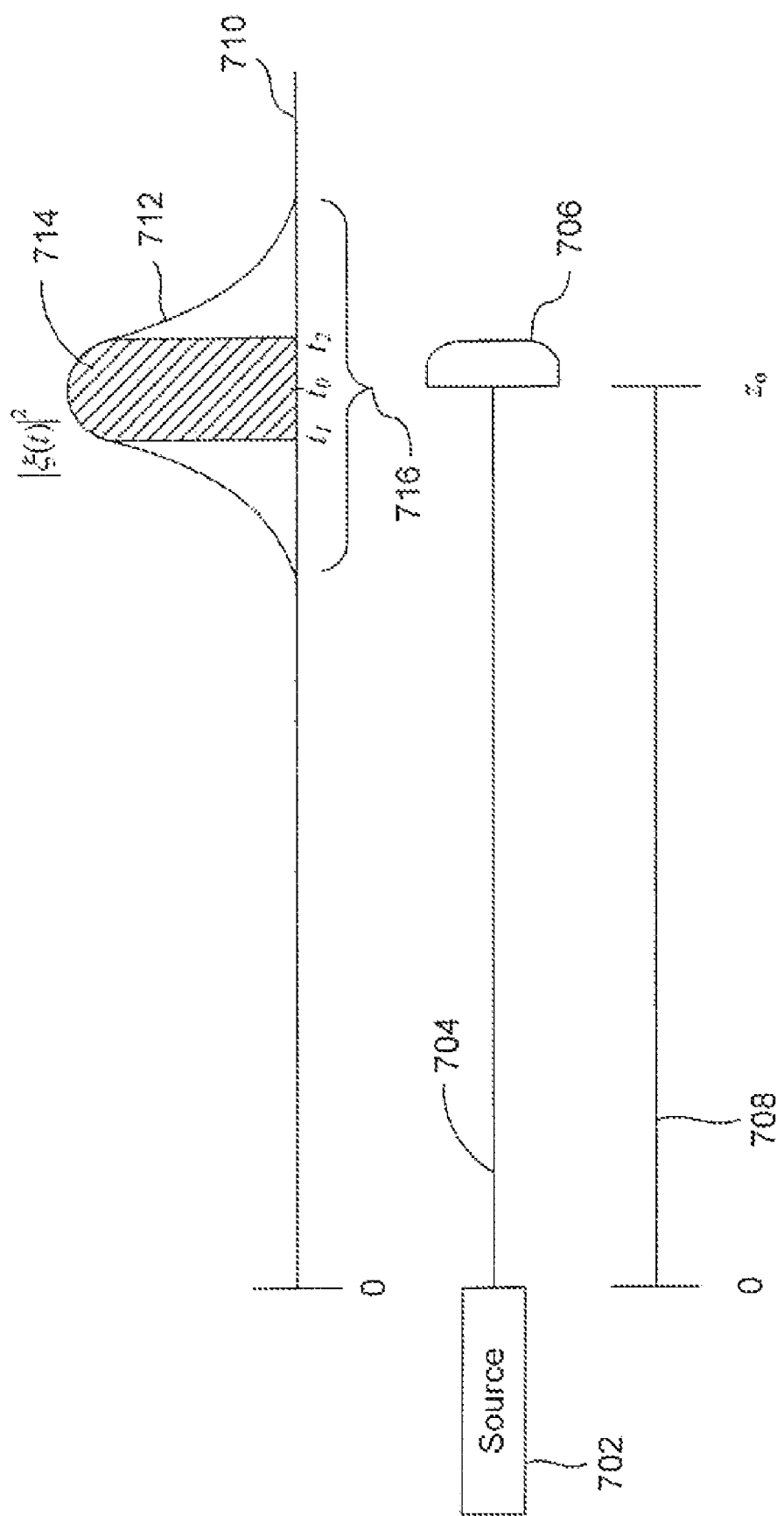
FIG. 7 illustrates a probability distribution function associated with detecting a photon pulse output from a source and transmitted to a detector.

FIG. 7 illustrates a probability distribution associated with a pulse output from a source 702 and transmitted in an optical fiber 704 to a detector 706. The horizontal line 708 represents the distance $z_0$ the photon travels from the source 702 to the detector 706, and the horizontal line 710 is a time axis. The curve 712 represents the photodetection probability density function $|\xi(t)|^2$. In FIG. 7, the photodetection probability density function $|\xi(t)|^2$ 712 is centered at the time $t_0$, which corresponds to the time a pulse takes to travel the distance $z_0$. An area under the curve 712 represents the probability of detecting the pulse within a particular time period. For example, hash-marked region 714 represents the probability of detecting the photon within the time period $t_1 < t_0 < t_2$. Time period 716 is called a "time bin" and corresponds to the time period within which the photon is detected at the detector 706.

The time dependent creation operators can be used to generate a photon wavepacket creation operator as follows:

$$\hat{a}_\xi^\dagger = \int_{-\infty}^{\infty} dt \xi(t) \hat{a}^\dagger(t)$$

The creation operator can be used to construct continuous-mode number states that represent photons transmitted through free space or in an optical fiber as follows:

$$|n_\xi\rangle = \frac{(\hat{a}_\xi^\dagger)^n}{\sqrt{n!}}|0\rangle,$$

where $|0\rangle$ is the continuous-mode vacuum state. The continuous-mode number states satisfy the following same conditions:

$$\hat{n}|n_\xi\rangle = n|n_\xi\rangle,$$
$$\langle n_\xi' | n_\xi\rangle = \delta_{n'n}, \text{ and}$$
$$\sum_{n_\xi=0}^{\infty} |n_\xi\rangle\langle n_\xi| = 1$$

As a result, the subscript $\xi$ used to identify continuous-mode number states can be dropped. Note that the wavepacket constructed photon is not an eigenstate of any Hamiltonian.

An Overview of Coherent States

The most common kind of single-mode states are linear superpositions of the number states. There are a number of different possible linear superpositions of the number states, but the coherent state:

$$|\alpha\rangle = \exp\left(-\frac{1}{2}|\alpha|^2\right) \sum_{n=0}^{\infty} \frac{\alpha^n}{\sqrt{n!}} |n\rangle$$

is a linear superposition of the number states used in many applications of quantized electromagnetic radiation. The coherent states are eigenstates of the annihilation operator:

$$\hat{a}|\alpha\rangle = \alpha|\alpha\rangle$$

where taking the complex conjugate gives:

$$\langle\alpha|\hat{a}^\dagger = \langle\alpha|\alpha^*$$

However, the coherent state $|\alpha\rangle$ is not an eigenstate of the creation operator $\hat{a}^\dagger$ because the summation over $\alpha$ cannot be rearranged to give the coherent state from $\hat{a}^\dagger|\alpha\rangle$ The coherent state expectation value for the number operator:

$$\langle n \rangle = \langle\alpha|\hat{n}|\alpha\rangle = |\alpha|^2$$

indicates that $|\alpha|^2$ is the mean number of photons. The probability of detecting n photons in a measurement of the number of photons is a Poisson distribution:

$$P_n = |\langle n | \alpha\rangle|^2 = \exp(-|\alpha|^2)\frac{|\alpha|^2}{n!}$$

The Poisson distribution approaches a Gaussian distribution for large values of $|\alpha|^2$.

The coherent state is a quantum state whose properties most closely resemble a classical electromagnetic wave of stable amplitude and fixed phase. For example, the electric field operator corresponding to an electric field propagating in the z direction, with the mode subscripts k and s removed, is:

$$\hat{E}(\Omega) = \frac{1}{2}\left(\hat{a}e^{-i\Omega} + \hat{a}^\dagger e^{i\Omega}\right) = \hat{X}\cos\Omega + \hat{Y}\sin\Omega$$

where the time t and displacement z are contained in the phase angle:

$$\Omega(z,t) = \omega t - kz - \frac{\pi}{2}$$

and the electric field is measured in units of $\sqrt{\hbar\omega/2\epsilon_0 V}$.

The coherent state is a nearly classical state because it gives the correct sinusoidal form for the electric field expectation value or coherent signal:

$$\Sigma = \langle\alpha|\hat{E}(\Omega)|\alpha\rangle = |\alpha|\cos(\Omega - \phi)$$

where $\alpha = |\alpha|e^{i\phi}$, and
$\phi$ is the mean phase angle of the coherent state excitation of the mode.

Polarization States and Stokes Parameters

In the current subsection, polarization states of electromagnetic radiation are discussed. As described above with reference to FIG. 5, electromagnetic radiation may be treated as propagating transverse electromagnetic waves. Each electromagnetic wave includes an electric field $\vec{E}(\vec{r},t)$ and a magnetic field $\vec{B}(\vec{r},t)$ component. However, it is the electric field component, alone, that can be used to represent an electromagnetic wave, because the electric field accounts for most of the interactions with charged matter and the magnitude of the magnetic field is smaller than the electric field by the factor 1/c. As shown in FIG. 5, when both the oscillating electric field $\vec{E}(\vec{r},t)$ component and the associated wavevector $\vec{k}$ of an electromagnetic field reside in a plane-of-vibration the field is said to be "linearly polarized." Definite polarization states can be created by transmitting electromagnetic radiation comprising numerous randomly polarized electromagnetic waves through one or more polarizers. Each polarizer is a device that transmits only the electromagnetic waves with electric field components that are aligned with the polarization axis of the polarizer.

Any two orthogonal linear polarization states can be used to define a polarization basis, denoted by $\{|H\rangle, |V\rangle\}$. The first polarization state $|H\rangle$ represents an electromagnetic wave polarized in a first direction, called the "horizontal polarization," and the second polarization state |V⟩ represents an electromagnetic wave polarized in a second direction that is orthogonal to the first direction, called the "vertical polarization." The polarization basis states satisfy the following conditions:

⟨H|H⟩=⟨V|V⟩=1, and

⟨H|V⟩=1

Figure 8A:
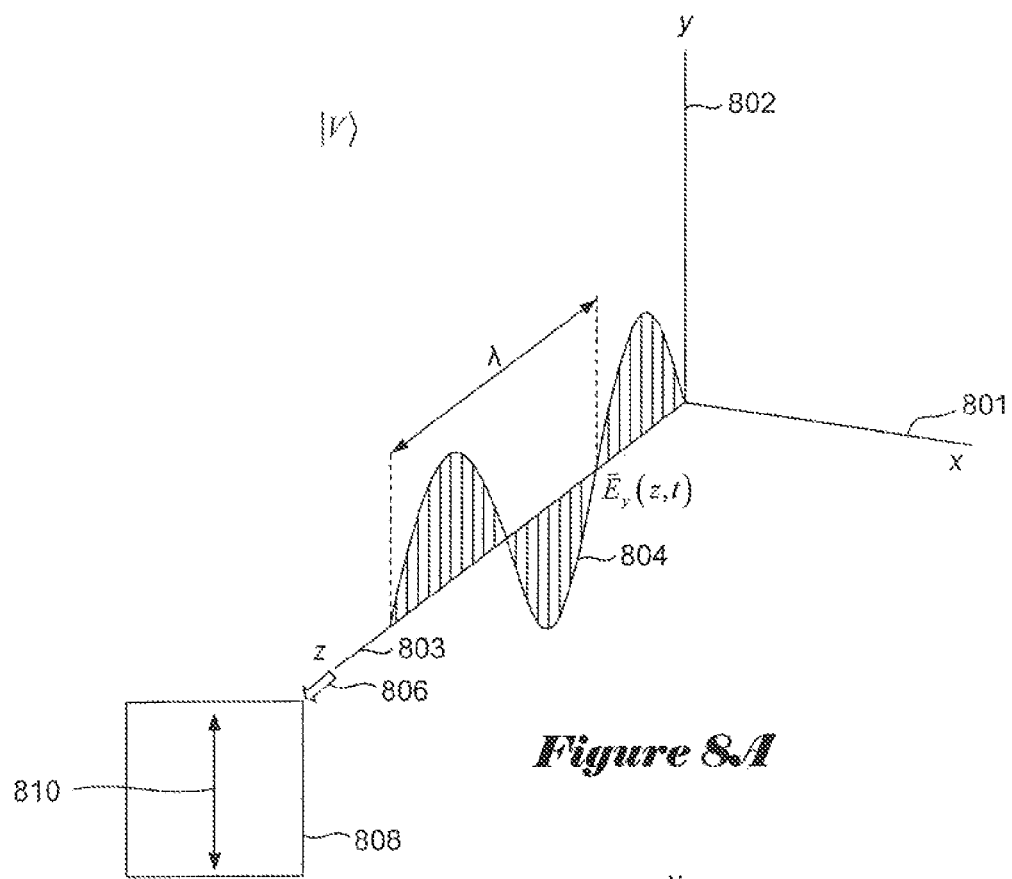
FIGS. 8A-8B show plots of vertical and horizontal polarization basis states.
Figure 8B:
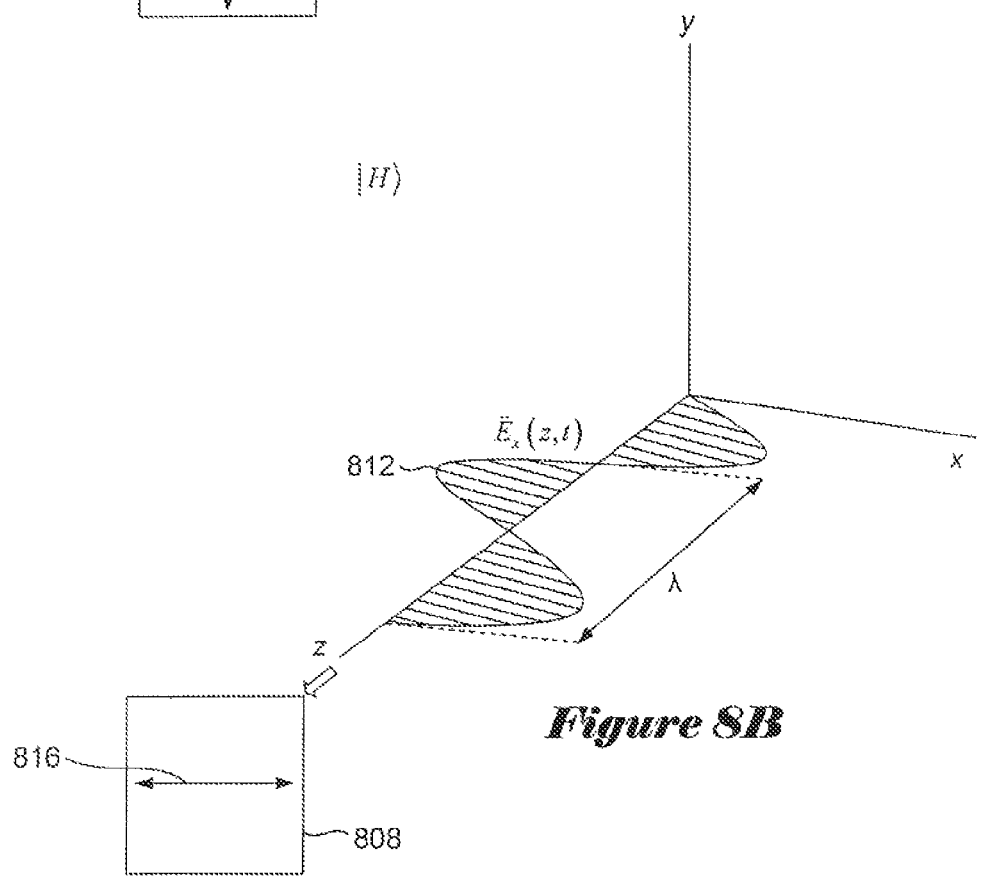

FIGS. 8A-8B show plots of the polarization basis states |H⟩ and |V⟩. In FIGS. 8A-8B, mutually perpendicular axes, such as mutually perpendicular axes 801-803 in FIG. 8A, represent the x, y, and z Cartesian coordinate axes, respectively. FIG. 8A shows a vertical polarization state |V⟩ of an electric field $\vec{E}_y(z,t)$ 804 that lies in the yz-plane. Directional arrow 806 represents the direction the electric field $\vec{E}_y(z,t)$ 804 propagates toward a plane of observation 808. From the plane of observation 808, one can observe the electric field $\vec{E}_y(z,t)$ 804 progress through one complete oscillatory cycle as the wave propagates along the z-axis through one wavelength λ. The oscillatory cycle is represented by a double-headed directional arrow 810. FIG. 8B shows a horizontal polarization state |H⟩ of an electric field $\vec{E}_x(z,t)$ 812 that lies in the xz-plane. The associated horizontal oscillatory cycle is represented by a double-headed directional arrow 816 in the plane of observation 808.

The polarization basis {|H⟩,|V⟩} can also be used to construct an infinite number of polarization states represented by |χ⟩. These polarization states simultaneously comprise both |H⟩ and |V⟩ and can be represented mathematically as a coherent linear superposition of states:

$$|\chi\rangle = \cos\left(\frac{\theta}{2}\right)|H\rangle + e^{i\phi}\sin\left(\frac{\theta}{2}\right)|V\rangle$$

where
  $0 \leq \theta < \pi$, and
  $0 \leq \phi < 2\pi$.

An infinite number of polarization states of an electromagnetic wave can be geometrically represented by a three-dimensional Bloch sphere, which in this case is also called the "Poincare sphere."

Figure 9A:
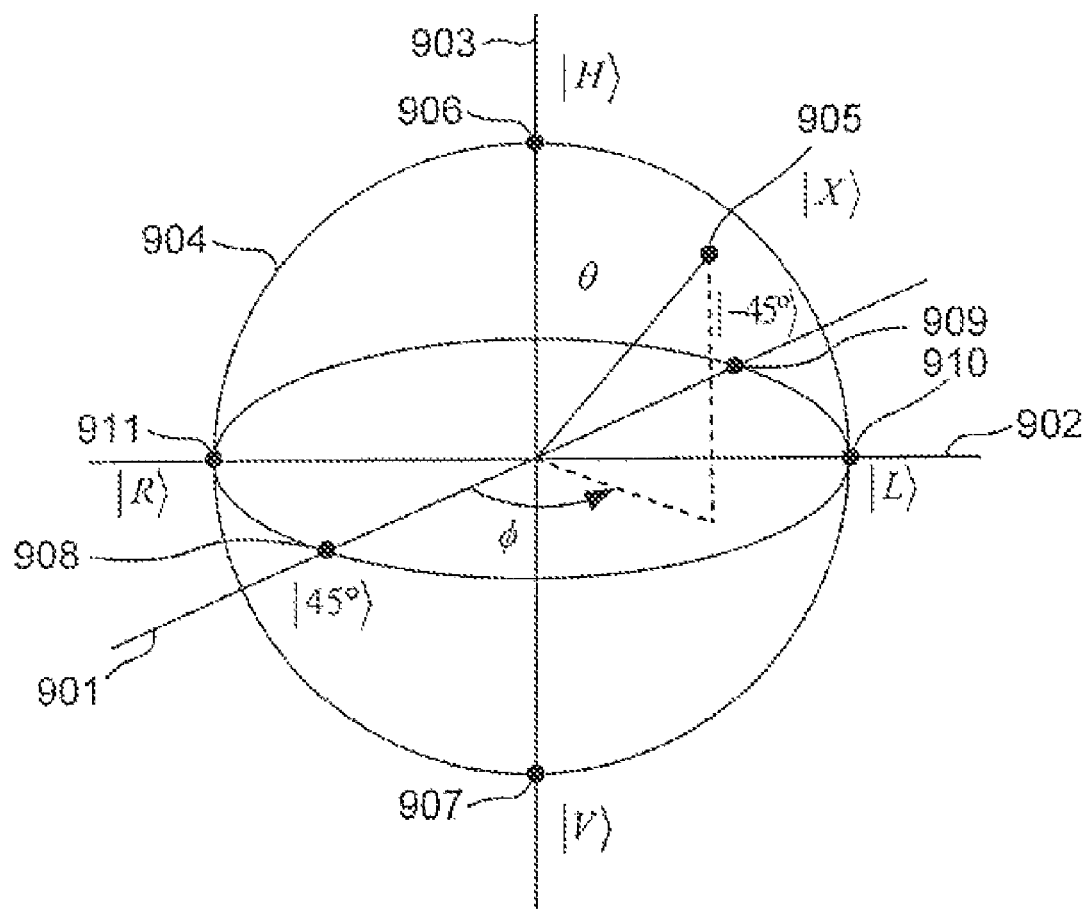
FIG. 9A illustrates a Poincare sphere representation of polarization states.

FIG. 9A illustrates a Poincare sphere representation of polarization states. As shown in FIG. 9A, lines 901-903 are orthogonal coordinate axes, respectively, and a Poincare sphere 904 is centered at the origin. There are an infinite number of points on the Poincare sphere 904, each point representing a unique pure polarization state |χ⟩ of an electromagnetic wave. For example, a point 905 on the Poincare sphere 904 represents a polarization state |χ⟩ that simultaneously comprises, in part, the state |H⟩ and, in part, the state |V⟩. The six points 906-911 identify intersections between the Poincare sphere 904 and the coordinate axes 901-903. The points 906 and 907 identify the polarization basis states |H⟩ and |V⟩, respectively, and the points 908-911 represent orthogonal polarization states:

$$|45°\rangle = \frac{1}{\sqrt{2}}(|H\rangle + |V\rangle),$$

$$|-45°\rangle = \frac{1}{\sqrt{2}}(|H\rangle - |V\rangle),$$

-continued $$|R\rangle = \frac{1}{\sqrt{2}}(|H\rangle - i|V\rangle), \text{ and}$$

$$|L\rangle = \frac{1}{\sqrt{2}}(|H\rangle + i|V\rangle),$$

respectively.

Figure 9B:
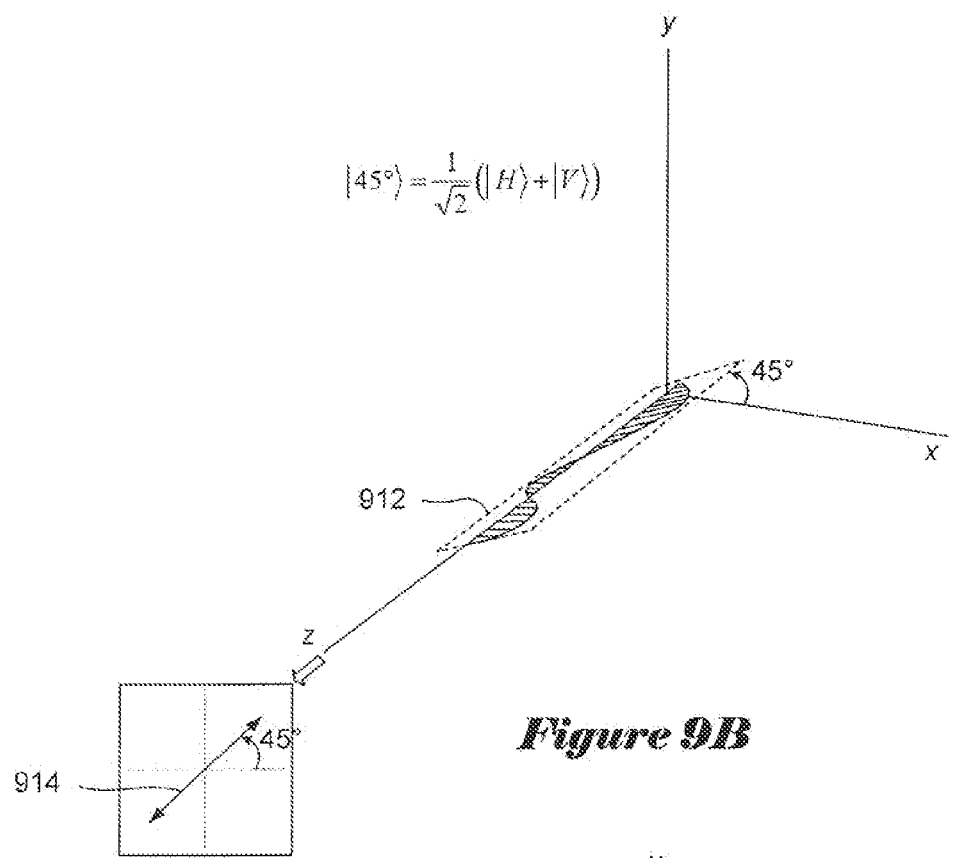
FIGS. 9B-9E show plots of four polarization states.
Figure 9C:
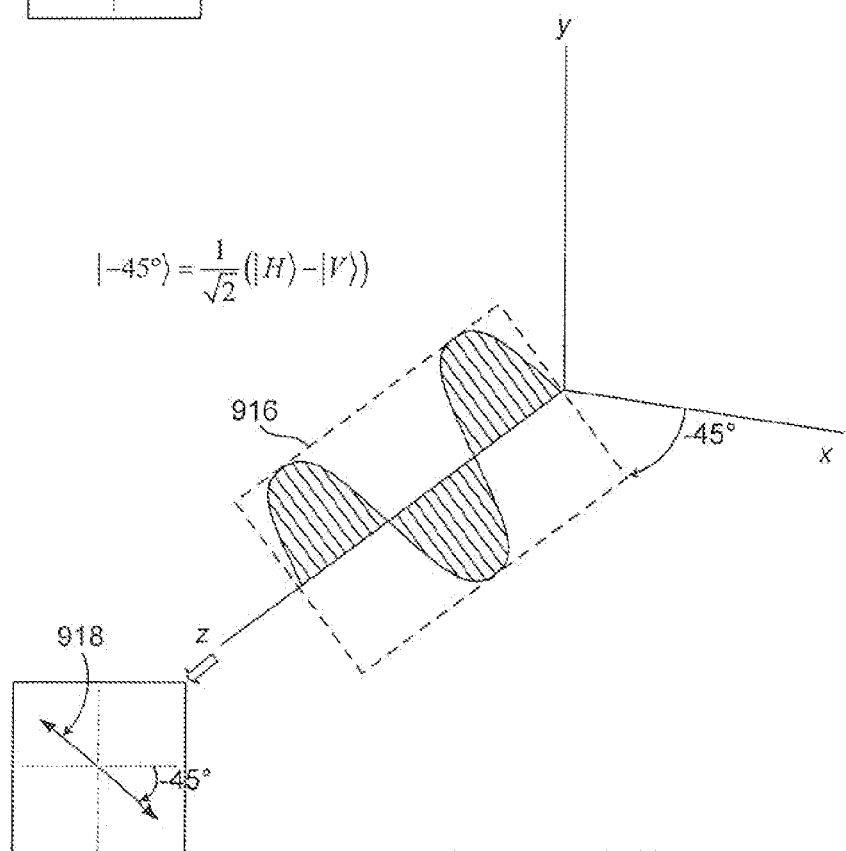
Figure 9D:
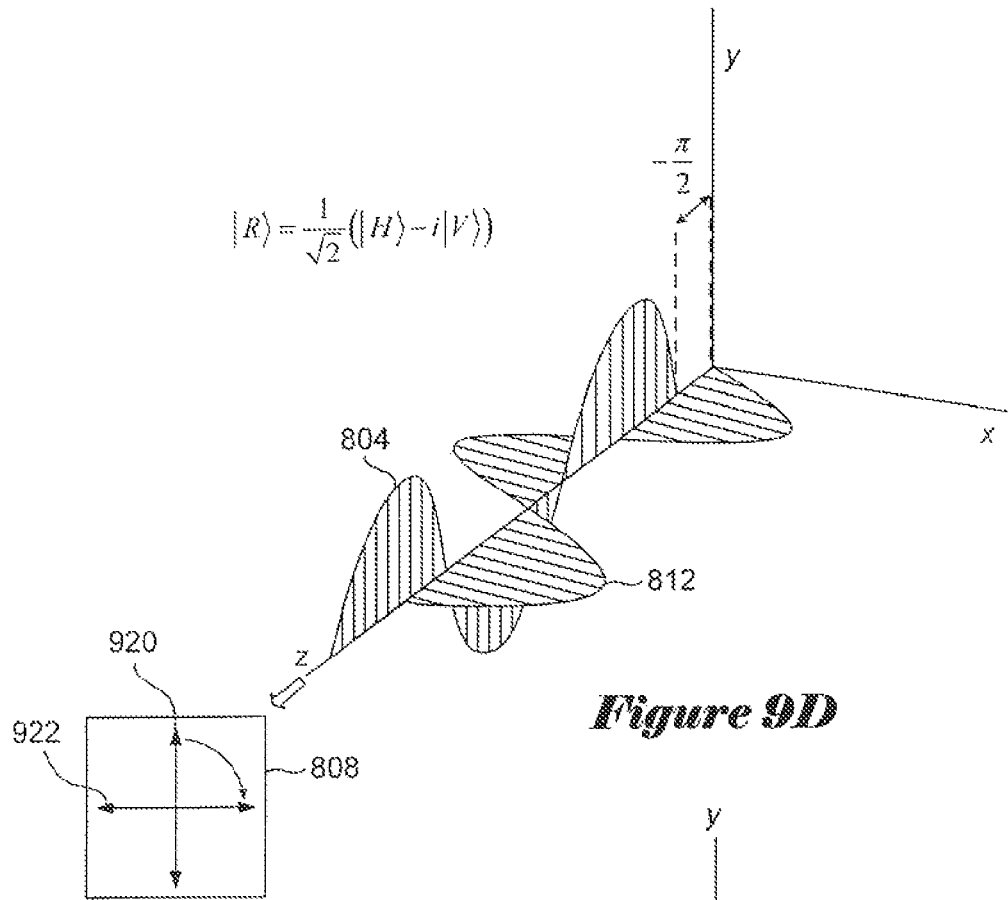
Figure 9E:
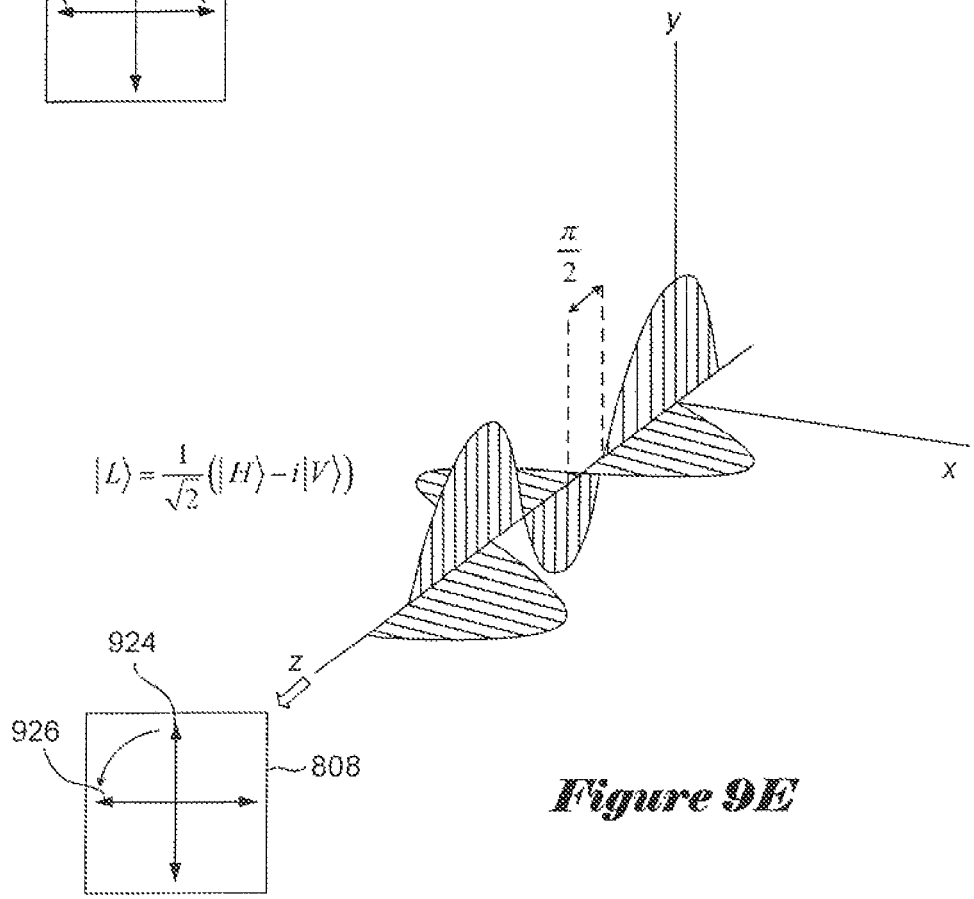

FIGS. 9B-9E show plots of the four polarization states |45°⟩, |−45°⟩, |R⟩, and |L⟩, respectively. FIG. 9B shows the 45° polarization state |45°⟩ that lies within a plane-of-vibration 912 which is tilted at a 45° angle to the horizontal xz-plane. The oscillatory cycle of the polarization state |45°⟩ is represented by a double-headed directional arrow 914. FIG. 9C shows the −45° polarization state |−45°⟩ that lies within a plane-of-vibration 916 which is tilted at a −45° angle to the horizontal xz-plane. The oscillatory cycle of the polarization state |−45°⟩ is represented by a double-headed directional arrow 918. FIG. 9D shows a right-handed circularly polarization state |R⟩ comprising the vertical and horizontal polarized fields 804 and 812, shown in FIGS. 8A and 8B, with a relative phase difference δ of −π/2. The result is an oscillatory cycle represented by two orthogonal double-headed directional arrows 920 and 922 that rotate in a clockwise direction within the plane of observation 808 as the fields 804 and 812 are transmitted along the z-axis. FIG. 9E shows a left-handed circularly polarization state also comprising the vertical and horizontal polarized fields 804 and 812 with a relative phase difference δ of π/2. The oscillatory cycle of the left-hand polarization state is represented by two orthogonal double-headed directional arrows 924 and 926 that rotate in a counterclockwise direction within the plane of observation 808.

Any polarization state can be represented by a linear combination of four quantities, called "Stokes parameters." Stokes parameters are a convenient way to represent the polarization states of quasi-monochromatic electromagnetic radiation because electromagnetic radiation measurements typically can only determine intensities or the number of photons and not the polarization states. The Stokes parameters all have the same dimension and, for a monochromatic wave, are given by the four quantities:

$$S_0 = \langle a_1^2 \rangle + \langle a_2^2 \rangle,$$

$$S_1 = \langle a_1^2 \rangle - \langle a_2^2 \rangle,$$

$$S_2 = 2\langle a_1 a_2 \cos\delta \rangle, \text{ and}$$

$$S_3 = 2\langle a_1 a_2 \sin\delta \rangle$$

where
  the symbol "⟨ ⟩" represents the average value;
  $a_1$ and $a_2$ are instantaneous amplitudes of two different orthogonal components $E_x$ and $E_y$ of the electric field vector; and
  δ is the phase difference between the components $E_x$ and $E_y$.

Only three of the Stokes parameters for a monochromatic wave are independent since the parameters are also related by the identity:

$$S_0^2 = S_1^2 + S_2^2 + S_3^2$$

Note that for a partially coherent quasi-monochromatic wave, the Stokes parameters are related by the inequality:

$$S_0^2 \geq S_1^2 + S_2^2 + S_3^2$$

The Stokes parameters are related to one another by the following Stokes relations:

$S_1 = S_0 \cos 2\chi \cos 2\psi,$ $S_2 = S_0 \cos 2\chi \sin 2\psi,$ and $S_3 = S_0 \sin 2\chi$ where
$0 \leq \psi \leq \pi,$ and $$-\frac{\pi}{4} \leq \chi \leq \frac{\pi}{4}$$

Figure 10:
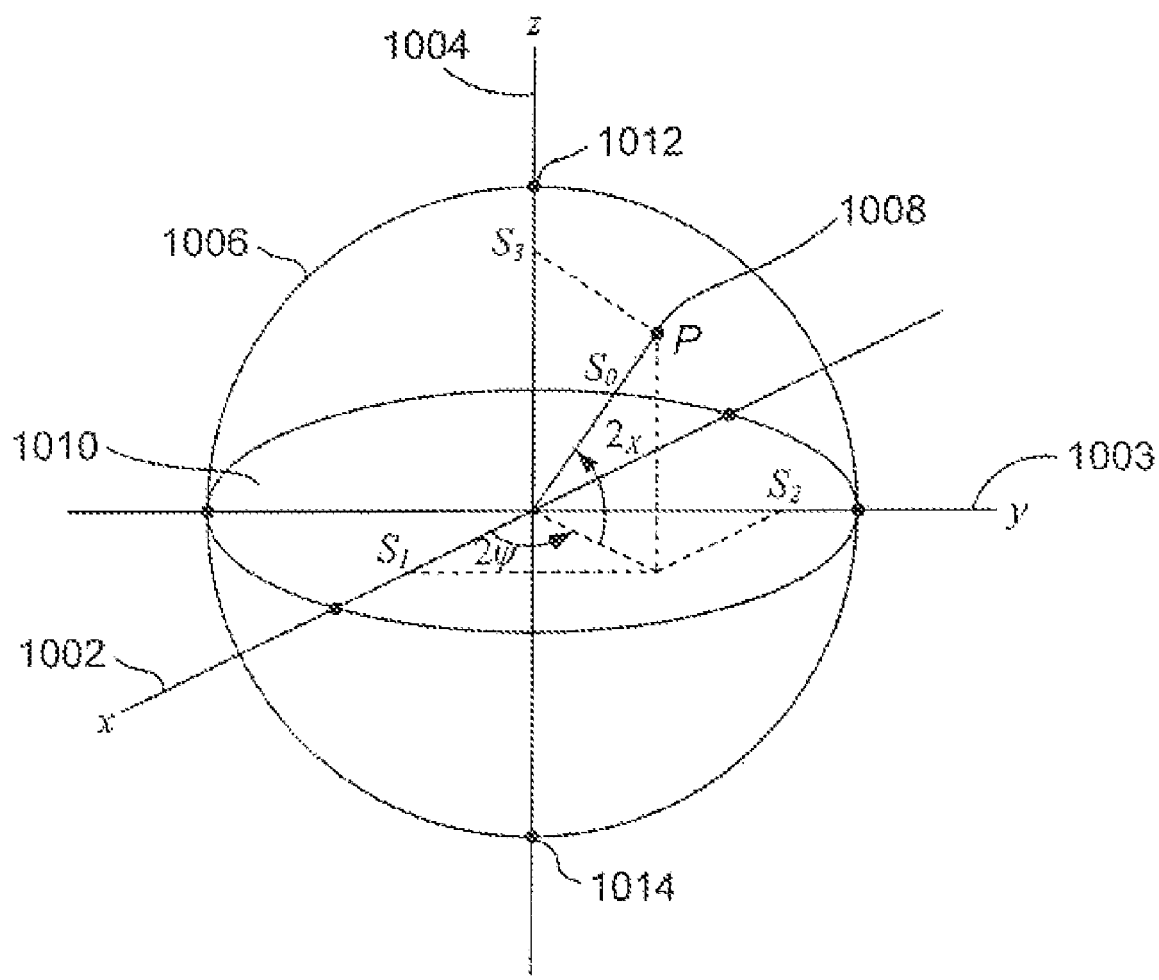
FIG. 10 illustrates a geometric representation of Stokes parameters.

FIG. 10 illustrates a geometric representation of the Stokes parameters $S_1$, $S_2$, and $S_3$. As shown in FIG. 10, lines 1002-1004 are orthogonal x, y, and z Cartesian coordinate axes, respectively. The sphere 1006 of radius $S_0$ indicates a geometric representation of all the different polarization states. The Stokes parameters $S_1$, $S_2$, and $S_3$ are regarded as the Cartesian coordinates of a point P 1008 on the sphere 1006 and $2\chi$ and $2\psi$ are the spherical angular coordinates of the point P 1008. For every possible polarization state of a given intensity $S_0$, there is a corresponding point on the sphere 1006 and vice versa. Right-handed polarization is represented by points on the sphere 1006 that lie above the equatorial xy-plane 1010, and left-handed polarization is represented by points that on the sphere 1006 that lie below the equatorial xy-plane 1010. For linearly polarized electromagnetic radiation, the phase difference δ is zero or an integral multiple of π and the parameter $S_3$ is zero. In other words, linearly polarized electromagnetic waves are represented by points that lie at the intersection of the sphere 1006 and the xy-plane 1010. For circularly polarized electromagnetic radiation, ⟨$a_1$⟩ equals ⟨$a_2$⟩ and the phase difference δ is π/2 or −π/2. Therefore, right-handed circularly polarized electromagnetic radiation is represented by a point 1012, and left-handed circularly polarized electromagnetic radiation is represented by a point 1014. Note that for partially coherent quasi-monochromatic waves, the states are represented by points that lie inside the sphere 1006, as indicated by the inequality above.

Typically, the Stokes parameters are normalized by dividing each parameter by the parameter $S_0$, which is equivalent to using an incident beam of unit intensity. The Stokes parameters $(S_0, S_1, S_2, S_3)$ for randomly polarized electromagnetic radiation in the normalized representation are $(1,0,0,0)$, which corresponds to the center of the sphere 1006. The normalized Stokes parameters are listed in Table I:

TABLE I

|       | \|H⟩ | \|V⟩ | \|45°⟩ | \|−45°⟩ | \|R⟩ | \|L⟩ |
|-------|------|------|--------|---------|------|------|
| $S_0$ | 1    | 1    | 1      | 1       | 1    | 1    |
| $S_1$ | 1    | −1   | 0      | 0       | 0    | 0    |
| $S_2$ | 0    | 0    | 1      | −1      | 0    | 0    |
| $S_3$ | 0    | 0    | 0      | 0       | 1    | −1   |

The Stokes parameters of any quasi-monochromatic wave of electromagnetic radiation may be determine by intensity or photon number measurements and are given by the relations:

$S_0 = I(0°, 0) + I(90°, 0),$ $S_1 = I(0°, 0) - I(90°, 0),$ $S_2 = I(45°, 0) - I(-45°, 0),$ and $S_3 = I\left(45°, \frac{\pi}{2}\right) - I\left(-45°, \frac{\pi}{2}\right),$ where $I(\theta, \epsilon)$ represents intensity of electromagnetic radiation with the electric field vibrations making an angle of θ with the x-axis when the y-component is subjected to a retardation ε with respect to the x-component. For example, the intensities $I(0°,0)$ and $I(90°,0)$ represent the intensities of horizontally and vertically polarized electromagnetic radiation, $I(45°,0)$ and $I(-45°,0)$ can represent the intensity of 45° and −45° polarized electromagnetic radiation, and $$I\left(45°, \frac{\pi}{2}\right) \text{ and } I\left(-45°, \frac{\pi}{2}\right)$$

represent right-handed and left-handed circularly polarized electromagnetic radiation.

Note that the parameter $S_0$ represents the total intensity. The parameter $S_1$ equals the excess in intensity of electromagnetic radiation transmitted by a polarizer which accepts linear polarization with an angle of θ equal to 0° over electromagnetic radiation transmitted with by a polarizer which accepts linear polarization with an angle of θ equal to 90°. The parameter $S_2$ has a similar interpretation. The parameter $S_3$ equals the excess in intensity of electromagnetic radiation transmitted by a polarizer which accepts right-handed circularly polarized electromagnetic radiation, over left-handed circularly polarized electromagnetic radiation.

Embodiments of the Present Invention

Figure 11:
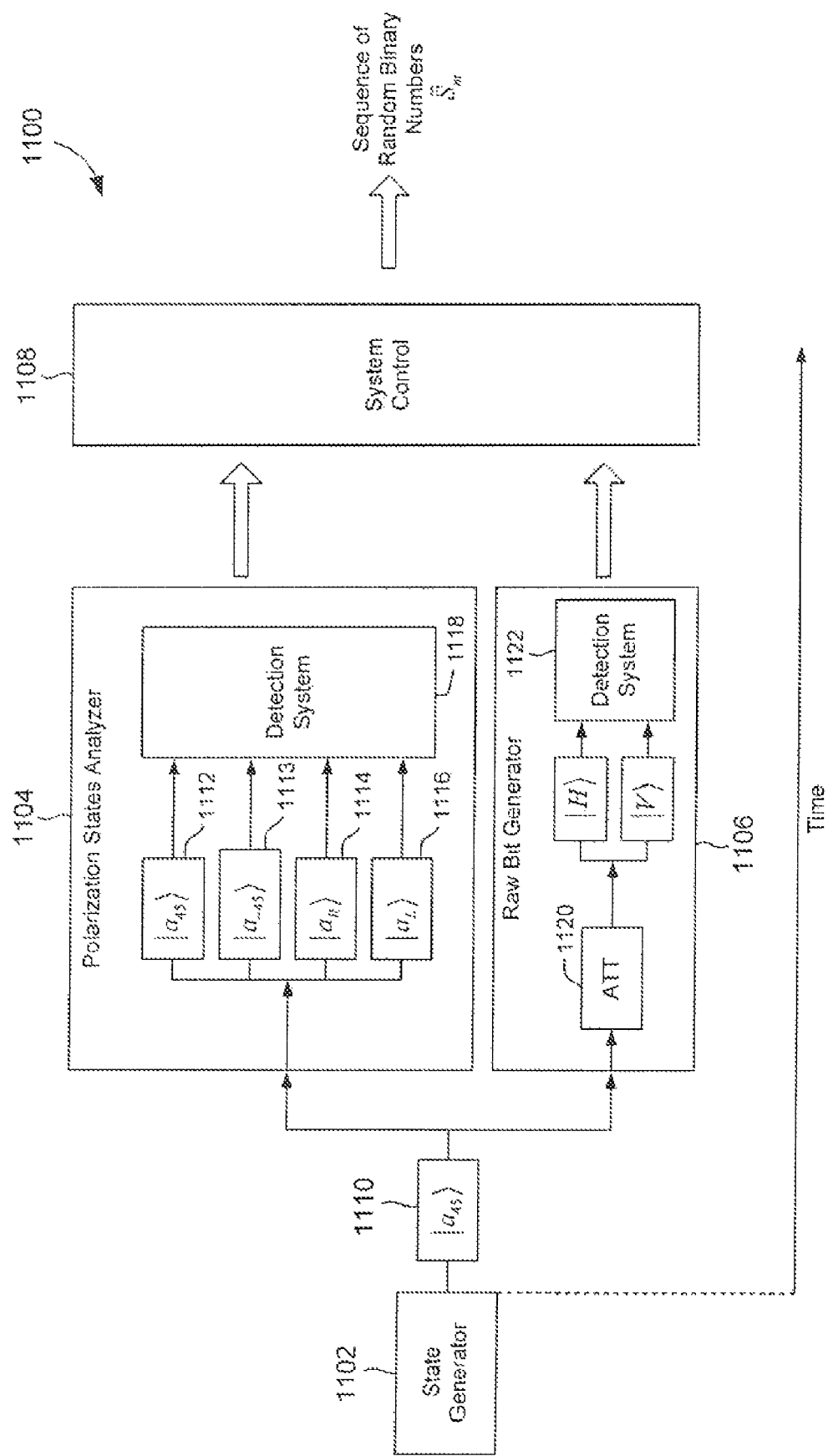
FIG. 11 illustrates a general optical-based schematic of a quantum random number generator that represents an embodiment of the present invention.

Various embodiments of the present invention are directed to optical-based, self-authenticating QRNGs that can be used to generate a sequence of random binary numbers. Embodiments of the present invention include quantum mechanical-based methods for constructing minimum entropy, which is used to evaluate and authenticate the sequence of random binary numbers. FIG. 11 illustrates a general schematic of a QRNG 1100 that represents an embodiment of the present invention. The QRNG 1100 comprises a state generator 1102, a polarization states analyzer ("PSA") 1104, a raw bit generator ("RBG") 1106, and a system control 1108. The state generator 1102 comprises a pulsed laser diode and a linear polarizer and outputs a 45° polarized pulse 1110 of electromagnetic radiation in a coherent state:

$$|\alpha_{45}\rangle = \frac{1}{\sqrt{2}}(|\alpha_H\rangle + |\alpha_V\rangle)$$

where $|\alpha_H\rangle$ represents a horizontally polarized coherent state; and
$|\alpha_V\rangle$ represents a vertically polarized coherent state.

The term "horizontal" refers to electromagnetic waves with the electric field component polarized parallel to the plane of the QRNG 1100, and the term "vertical" refers to electromagnetic waves with the electric field component polarized orthogonal to the plane of the QRNG 1100. The polarized pulse of electromagnetic radiation $|\alpha_{45}\rangle$ 1110 is split so that a first portion of the pulse $|\alpha_{45}\rangle$ 1110 is transmitted to the PSA 1104 and a second portion of the pulse $|\alpha_{45}\rangle$ 1110 is transmitted to the RBG 1106. Different device embodiments for the PSA 1104 and the RBG 1106 are described below with reference to FIGS. 12-14. For each pulse $|\alpha_{45}\rangle$ 1110 generated by the state generator 1102, the PSA 1104 projects the initial state onto four different polarized coherent states of electromagnetic radiation. The four differently polarized coherent states are: (1) a 45° polarized pulse $|\alpha_{45}\rangle$ 1112, (2) −45° polarized pulse $|\alpha_{-45}\rangle$ 1114, (3) a right-handed circularly polarized pulse $|\alpha_R\rangle$ 1116, and (4) a left-handed circularly polarized pulse $|\alpha_L\rangle$ 1118. The PSA 1104 includes a detection system 1120 that detects the states 1112-1116 and transmits the detection results to the system control 1108. The RBG 1106 includes an attenuator 1120 that reduces the number of photons in the pulse $|\alpha_{45}\rangle$ 1110 as follows:

$$|\alpha_{45}\rangle \xrightarrow{ATT} \begin{cases} |0\rangle \\ \frac{1}{\sqrt{2}}(|H\rangle + |V\rangle) \end{cases}$$

when no photon is output
when one photon is output where $|H\rangle$ represents a horizontally polarized pulse comprising a single photon; and
$|V\rangle$ represents a vertically polarized pulse comprising a single photon.

The RBG 1106 includes a detection system 1122 that detects the presence of a single photon, which is either the state $|H\rangle$ or the state $|V\rangle$ and transmits the detection result to the system control 1108. The photon polarization states $|H\rangle$ and $|V\rangle$ are used to encode binary numbers. For example, detection of the state $|H\rangle$ can be used to represent the binary number "1" and detection of the state $|V\rangle$ can be used to represent the binary number "0." For N operation cycles of the QRNG 1100, the system control 1108 receives the detection results supplied by the PSA 1104 and the RBG 1106 and outputs a sequence of random binary numbers represented by a vector $\bar{s}_m$, where m represents the number of random binary numbers and m<N. Methods embodiments directed to constructing the sequence of random binary numbers $\bar{s}_m$ are described below with reference to FIGS. 15-21.

Figure 13A:
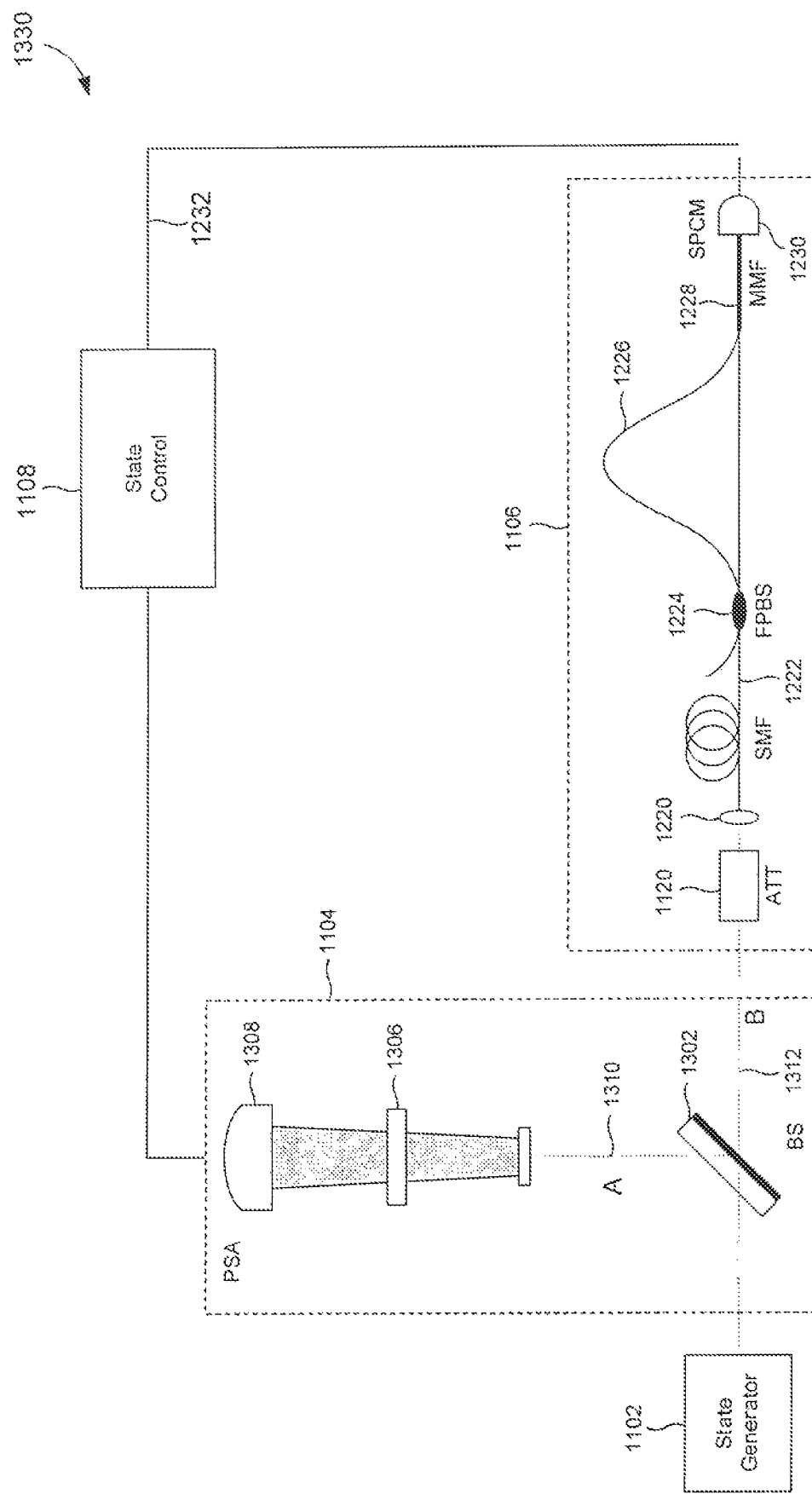
FIGS. 13A-13B illustrate a schematic representation of a second quantum random number generator that represents an embodiment of the present invention.
Figure 13B:
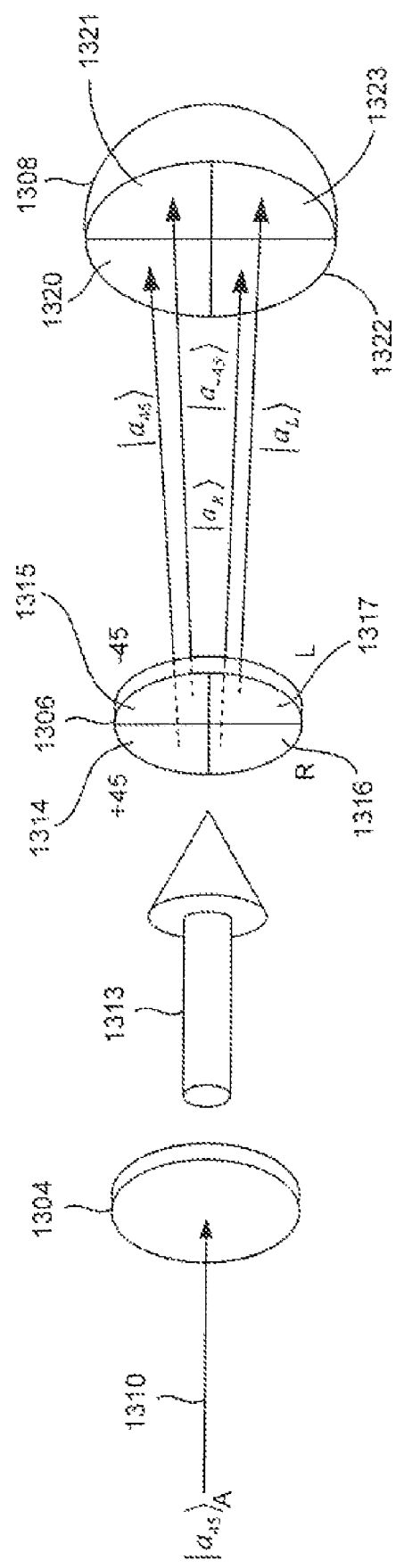
Figure 14:
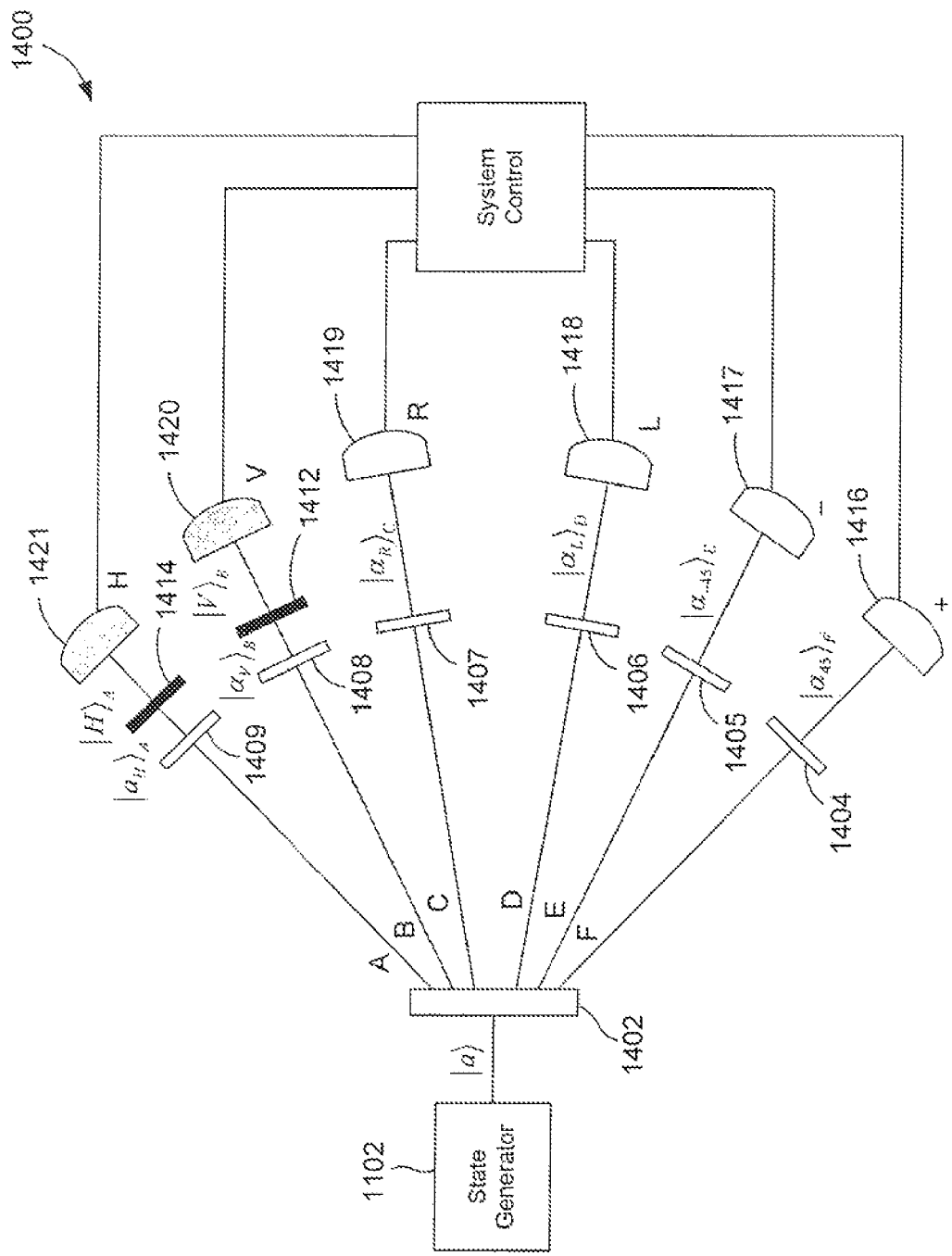
FIG. 14 illustrates a schematic representation of a third quantum random number generator that represents an embodiment of the present invention.

FIGS. 12-14 illustrate three different QRNG device embodiments of the present invention that are in accordance with the general QRNG 1100 embodiment described above. In the interest of brevity, components of the QRNGs, shown in FIGS. 12-14, that are identical to the components of the general QRNG 1100 shown in FIG. 11 have been provided with the same reference numerals and an explanation of their structure and function is not repeated.

Figure 12A:
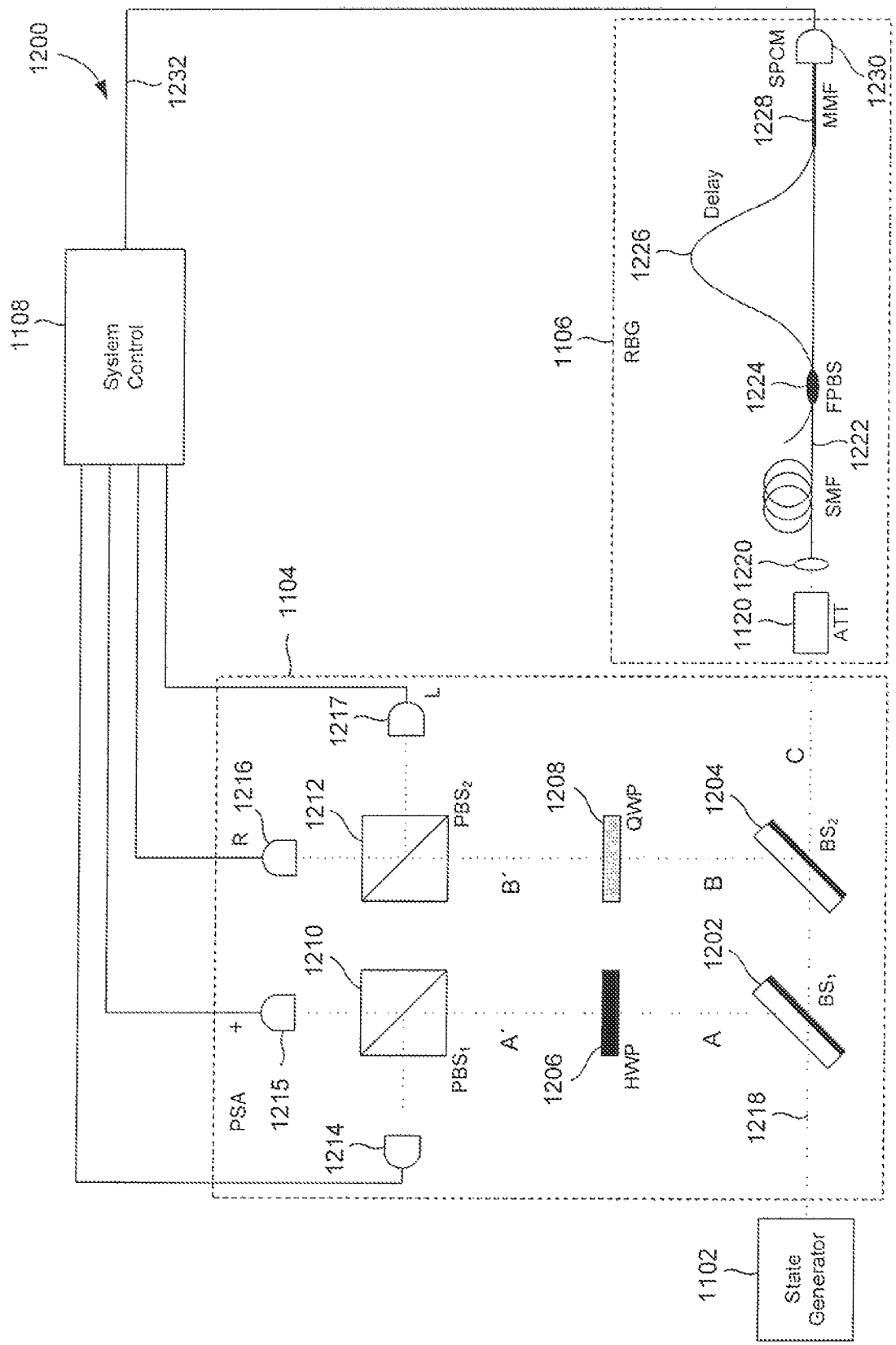
FIG. 12A illustrate a schematic representation of a first quantum random number generator that represents an embodiment of the present invention.

FIG. 12A illustrates a schematic representation of a first QRNG 1200 that represents an embodiment of the present invention. The PSA 1104 comprises a pulsed state generator 1102, a first beamsplitter ("BS$_1$") 1202, a second beamsplitter ("BS$_2$") 1204, a half-wave plate 1206, a quarter-wave plate 1208, a first polarization beamsplitter ("PBS$_1$") 1210, a second polarization beamsplitter ("PBS$_2$") 1212, and four photodiode detectors 1214-1217. The four photodetectors 1214-1217 can be p-i-n photodiodes which are well-known in the art. Dotted lines, such as dotted line 1218, represent electromagnetic radiation transmission paths within the PSA 1104 and can represent either optical fibers or transmission paths in free space. The RBG 1106 comprises the attenuator 1120, a coupler 1220, a single mode fiber ("SMF") 1222, a fiber polarization beamsplitter ("FPBS") 1224, delay fiber 1226, a multi-mode optical fiber 1228, and a single photon counting module ("SPCM") 1230. The delay fiber 1226 and SMF 1222 are single mode optical fibers that can be used to transmit either zero photons or a single photon of electromagnetic radiation. The coupler 1220 couples the attenuator 1120 to the SMF 1222, and the MMF 1228 transmits two or more modes of electromagnetic radiation to the SPCM 1230, which can be an avalanche photodiode operated with a high-signal intensity in order to detect single photons. The photodiode detectors 1214-1217 and the SPCM 1230 are connected by signal lines, such as signal line 1232, to the system control 1108. The BS$_1$ 1202 and the BS$_2$ 1204 split the pulse $|\alpha_{45}\rangle$ into three different transmission paths identified in FIG. 12 as A, B, and C. The state of the pulse $|\alpha_{45}\rangle$ after the BS$_1$ 1202 and the BS$_2$ 1204 is given by:

$$|\alpha_{45}\rangle \xrightarrow{BS_1 BS_2} c_A|\alpha_{45}\rangle_A + c_B|\alpha_{45}\rangle_B + c_C|\alpha_{45}\rangle_C$$

where $|c_A|^2 + |c_B|^2 + |c_C|^2 = 1$ $|\alpha_{45}\rangle_A$ represents 45° polarized electromagnetic radiation reflected into the transmission path A;
$|\alpha_{45}\rangle_B$ represents 45° polarized electromagnetic radiation reflected into the transmission path B; and
$|\alpha_{45}\rangle_C$ represents 45° polarized electromagnetic radiation transmitted along the transmission path C.

The polarization of the electromagnetic radiation reflected by the BS$_1$ 1206 is changed by the HWP 1206 as follows:

$$|\alpha_{45}\rangle_A \xrightarrow{HWP} \frac{1}{\sqrt{2}}(|\alpha_R\rangle_{A'} + |\alpha_L\rangle_{A'})$$

and the polarization state of the electromagnetic radiation reflected by the BS$_2$ 1203 is changed by the QWP 1208 as follows:

$$|\alpha_{45}\rangle_B \xrightarrow{HWP} \frac{1}{\sqrt{2}}(|\alpha_R\rangle_{B'} + |\alpha_L\rangle_{B'})$$

Horizontally polarized pulses $|\alpha_H\rangle$ are detected by the detectors 1215 and 1216, and vertically polarized pulses $|\alpha_V\rangle$ are detected by the detectors 1214 and 1217.

Figure 12B:
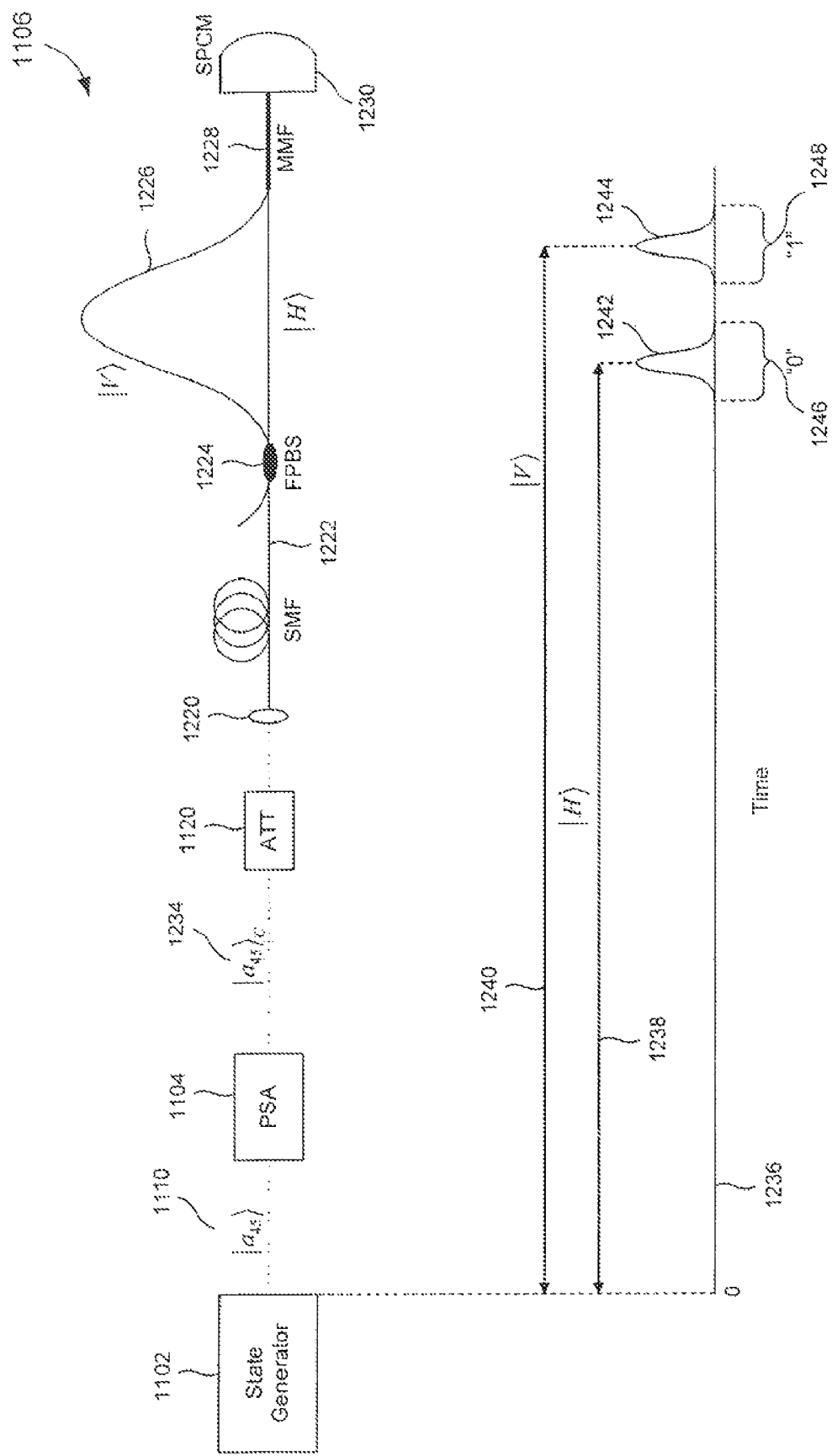
FIG. 12B illustrates operation of a random bit generator to randomly generate binary numbers that represents an embodiment of the present invention.

A sequence of random binary numbers is generated by the RBG 1106 using time-bin encoding. FIG. 12B illustrates operation of the RBG 1106 that represents an embodiment of the present invention. The attenuator 1120 reduces the state of the pulse $|\alpha_{45}\rangle_C$ 1234 to either the vacuum state $|0\rangle$ or to a single photon in the coherent linear superposition of states $(|H\rangle+|V\rangle)/\sqrt{2}$. The FPBS 1224 transmits a single horizontally polarized photon $|H\rangle$ along the SMF 1222 to the MMF 1228 and reflects a single vertically polarized photon $|V\rangle$ into the delay fiber 1226. Because the delay fiber 1226 is longer than the distance between the FPBS 1224 and the MMF 1228, the time it takes for a vertically polarized photon $|V\rangle$ to reach the SPCM 1230 is longer than the time it takes for a horizontally polarized photon $|H\rangle$ to reach the SPCM 1230. Line 1236 represents a time axis and "0" identifies the start time when a pulse $|\alpha_{45}\rangle$ 1110 is output from the state generator 1102. Double-headed directional arrow 1238 represents the average time it takes for the pulse $|\alpha_{45}\rangle$ 1110 to result in detection of a single horizontally polarized photon $|H\rangle$ at the SPCM 1230. Double-headed directional arrow 1240 represents the average time it takes for the pulse $|\alpha_{45}\rangle$ 1110 to result in detection of a single vertically polarized photon $|V\rangle$ at the SPCM 1230. Curves 1242 and 1244 represent normal distributions of photon detection events at the SPCM 1230. The length of the delay fiber 1226 can be adjusted so that the curves' 1242 and 1244 tails do not overlap. The width of the curves 1242 and 1244 define non-overlapping time bins 1246 and 1248, respectively, which are used to generate a random binary number. For example, for each pulse $|\alpha_{45}\rangle$ 1110 output from the state generator 1102, an event is recorded by the system control 1108. The events recorded by the system control 1108 are described as follows: when a photon is detected in the time bin 1246 the binary number "1" is recorded, and when a photon is detected in the time bin 1248 the binary number "0" is recorded. When no photon is detected in either the time bin 1246 or the time bin 1248, "No Photon" is recorded, and when photons are detected in both time bins 1246 and 1248, an "Error" is recorded. Table II displays the four kinds of events that can be recorded by the system control 1108 for each pulse $|\alpha_{45}\rangle$ 1110 output from the state generator 1102:

TABLE II

| Detection at SPCM | Photon State | Information Recorded |
|---|---|---|
| Time bin 1248 | $|H\rangle$ | "0" |
| Time bin 1246 | $|V\rangle$ | "1" |
| Both time bins 1246 and 1248 | $|H\rangle$ and $|V\rangle$ | Error |
| No photon detected | $|0\rangle$ | No Photon |

Figure 12C:
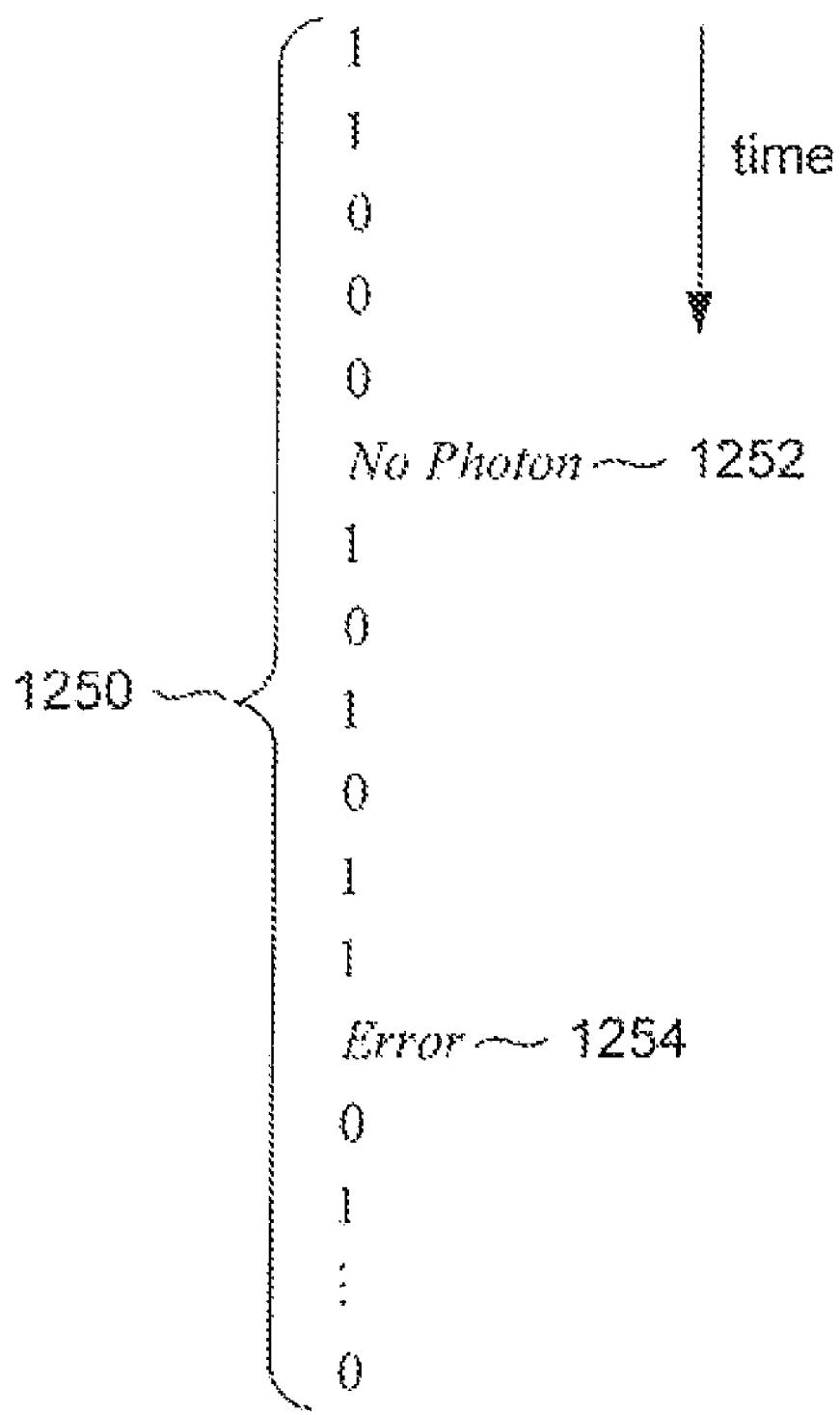
FIG. 12C illustrates a hypothetical sequence of raw counts recorded by a system control that represents an embodiment of the present invention.

Each event recorded by the system control 1108 is called a "raw count." FIG. 12C illustrates a hypothetical sequence of N raw counts 1250 recorded by the system control 1108 for N pulses $|\alpha_{45}\rangle$ 1110 generated by the state generator 1102 that represents an embodiment of the present invention. The sequence of N raw counts 1250 includes sequences of binary numbers "0" and "1" separated by a raw count "No Photon" 1252 and a raw count "Error" 1254. Method embodiments of the present invention, described below with reference to FIGS. 15-21, are directed to using the data polarization states generated by the PSA 1104 to sift the sequence of N raw counts in order to obtain the sequence of random binary numbers $\bar{s}_m$. Note that detection of pulses by both the PSA 1104 and RBG 1106 are synchronized.

FIGS. 13A-13B illustrate a schematic representation of a second QRNG 1300 that represents an embodiment of the present invention. As shown in FIG. 13A, the QRNG 1300 comprises a pulsed state generator 1102, a RBG 1106 that includes identical structural components and operation to that of the QRNG 1200 shown in FIG. 12. Therefore, in the interest of brevity these components have been provided in FIG. 13A with the same reference numerals and an explanation of their structure and operation is not repeated. The QRNG 1300 also comprises a PSA 1104 that includes a beamsplitter ("BS") 1302, a concave lens 1304, a quadrant polarization filter 1306, and a quadrant photodiode detector 1308. The BS 1302 splits the polarized pulse of electromagnetic radiation $|\alpha_{45}\rangle$ into a first pulse $|\alpha_{45}\rangle_A$ reflected into the transmission path 1310 and a second pulse $|\alpha_{45}\rangle_B$ transmitted along the transmission path 1312. The concave lens 1304 causes the electromagnetic radiation of the pulse $|\alpha_{45}\rangle_A$ to diverge as the pulse reaches the quadrant polarization filter 1306.

FIG. 13B illustrates a perspective view the quadrant polarization filter 1306 and the quadrant photodiode detector 1308. The concave lens 1304 causes the electromagnetic radiation in the first pulse $|\alpha_{45}\rangle_A$ 1310 to diverge, as indicated by an enlarged directional arrow 1313. The quadrant polarization filter 1306 is divided into four polarization sectors, each polarization sector outputting one of four types of polarizations. For example, the quadrant polarization filter 1306 comprises the following polarization sectors: (1) a first polarization sector 1314 that outputs a 45° polarized pulse $|\alpha_{45}\rangle$, (2) a second polarization sector 1315 that outputs a −45° polarized pulse $|\alpha_{-45}\rangle$, (3) a third polarization sector 1316 that outputs a right-handed circularly polarized pulse $|\alpha_R\rangle$, and (4) a fourth polarization sector 1317 that outputs a left-handed circularly polarized pulse $|\alpha_L\rangle$. The quadrant photodiode detector 1308 is divided into four independent detection areas 1320-1322, each detection area is aligned with a polarization sector of the quadrant polarization filter 1306, and each detection area can independently detect a pulse output from an aligned and corresponding polarization sector. For example, the detection areas 1320-1322 are aligned with the polarization sectors 1314-1317, respectively, to detect the pulses output from the aligned polarization sectors 1314-1317. The quadrant photodiode detector 1308 transmits each detection event to the system control 1108.

FIG. 14 illustrates a schematic representation of a third QRNG 1400 that represents an embodiment of the present invention. The QRNG 1400 comprises a continuous electromagnetic wave state generator 1102, a 1:6 BS 1402, polarization filters 1404-1409, attenuators 1412 and 1414, p-i-n photodiodes 1416-1419, and SPCMs 1420 and 1421. The SPCMs 1420 and 1421 can be avalanche photodiodes. The QRNG 1400 also comprises the state generator 1102 and the system control 1108 described above with reference to FIGS. 12 and 13. The 1:6 BS 1402 is a grated beamsplitter that splits a single continuous wave of electromagnetic radiation input in a coherent state $|\alpha\rangle$ into six separate beams transmitted along transmission paths labeled A-F as follows:

$$|\alpha\rangle \xrightarrow{1:6BS} \frac{1}{\sqrt{6}}(|\alpha\rangle_A + |\alpha\rangle_B + |\alpha\rangle_C + |\alpha\rangle_D + |\alpha\rangle_E + |\alpha\rangle_F)$$

The polarization filters 1404-1409 are oriented so that each beam transmitted in the transmission paths A-F outputs one of six different polarized coherent states as follows:

$|\alpha\rangle_A \rightarrow |\alpha_H\rangle_A$, $|\alpha\rangle_B \rightarrow |\alpha_V\rangle_B$, $|\alpha\rangle_C \rightarrow |\alpha_R\rangle_C,$ $|\alpha\rangle_D \rightarrow |\alpha_L\rangle_D,$ $|\alpha\rangle_E \rightarrow |\alpha_{-45}\rangle_E,$ and $|\alpha\rangle_F \rightarrow |\alpha_{45}\rangle_F$ The attenuators 1412 and 1414 reduce the number of photons comprising the continuous waves $|\alpha_H\rangle_A$ and $|\alpha_V\rangle_B$ to either the vacuum (ground) states $|0\rangle_A$ and $|0\rangle_B$, respectively, or to single photons in the states $|H\rangle_A$ and $|V\rangle_D$, respectively. The single photon states are detected with the avalanche photodiodes 1420 and 1421. The detectors 1416-1421 transmit detection events to the system control 1108. The detection events results in a sequence of raw counts as described above with reference to FIG. 12. Note that processing the detection events to generate a sequence of random binary numbers $\bar{s}_m$ does not necessitate synchronous detection between the p-i-n photodiodes 1416-1419 and the avalanche photodiodes 1420 and 1421.

Figure 15:
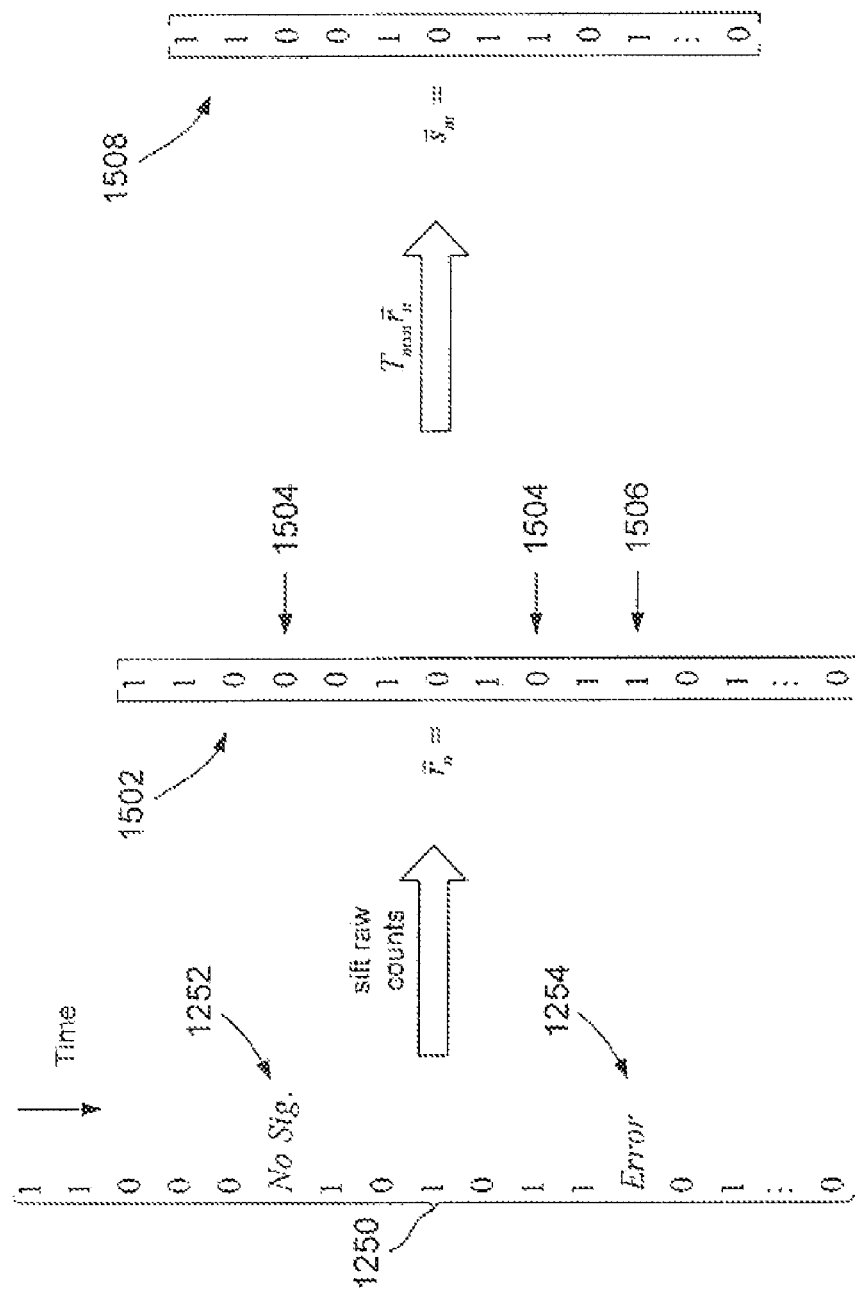
FIG. 15 illustrates generating a sequence of random binary numbers from a sequence of raw counts that represents an embodiment of the present invention.

FIG. 15 illustrates generating a hypothetical sequence of random binary numbers from a sequence of raw counts that have been generated by operating any one of the QRNGs, described above with reference to FIGS. 11-14, N times that represents an embodiment of the present invention. Operating the QRNG 1100 N times produces the sequence of N raw counts 1250, shown in FIG. 12C. The raw counts corresponding to "No Photon" and "Error" detection events, such as "No Photon" 1252 and the "Error" 1254, are removed from the sequence of raw counts to produce a raw sequence of n binary numbers, which are assembled into a column vector 1502 denoted by $\bar{r}_n$, where n<N. The raw sequence 1502 includes a number of hypothetically biased binary numbers, such as hypothetically biased binary numbers 1504-1506. Quantum mechanical-based methods of the present invention are used to construct an m×n Toeplitz matrix $T_{n \times m}$, which is used to sift out the biased binary numbers in the raw sequence $\bar{r}_n$ 1502 to produce the sequence of m random binary numbers $\bar{s}_m$ as follows:

$$\bar{e}_m = T_{n \times m} \bar{r}_n$$

where m<n<N. The sequence of random binary numbers $\bar{s}_m$ is represented by a column vector 1508.

Barak et al., in a chapter titled "True Random Number Generators Secure in a Changing Environment," in a book titled "Cryptographic Hardware and Embedded Systems CHES 2003," by C. D. Walter et al. (Eds.) pp. 166-180, Springer-Verlag (2003) provides a mathematical definition of the Toeplitz matrix. The following discussion provides the insight needed to construct the Toeplitz matrix in accordance with the Barak et al. reference.

Figure 16:
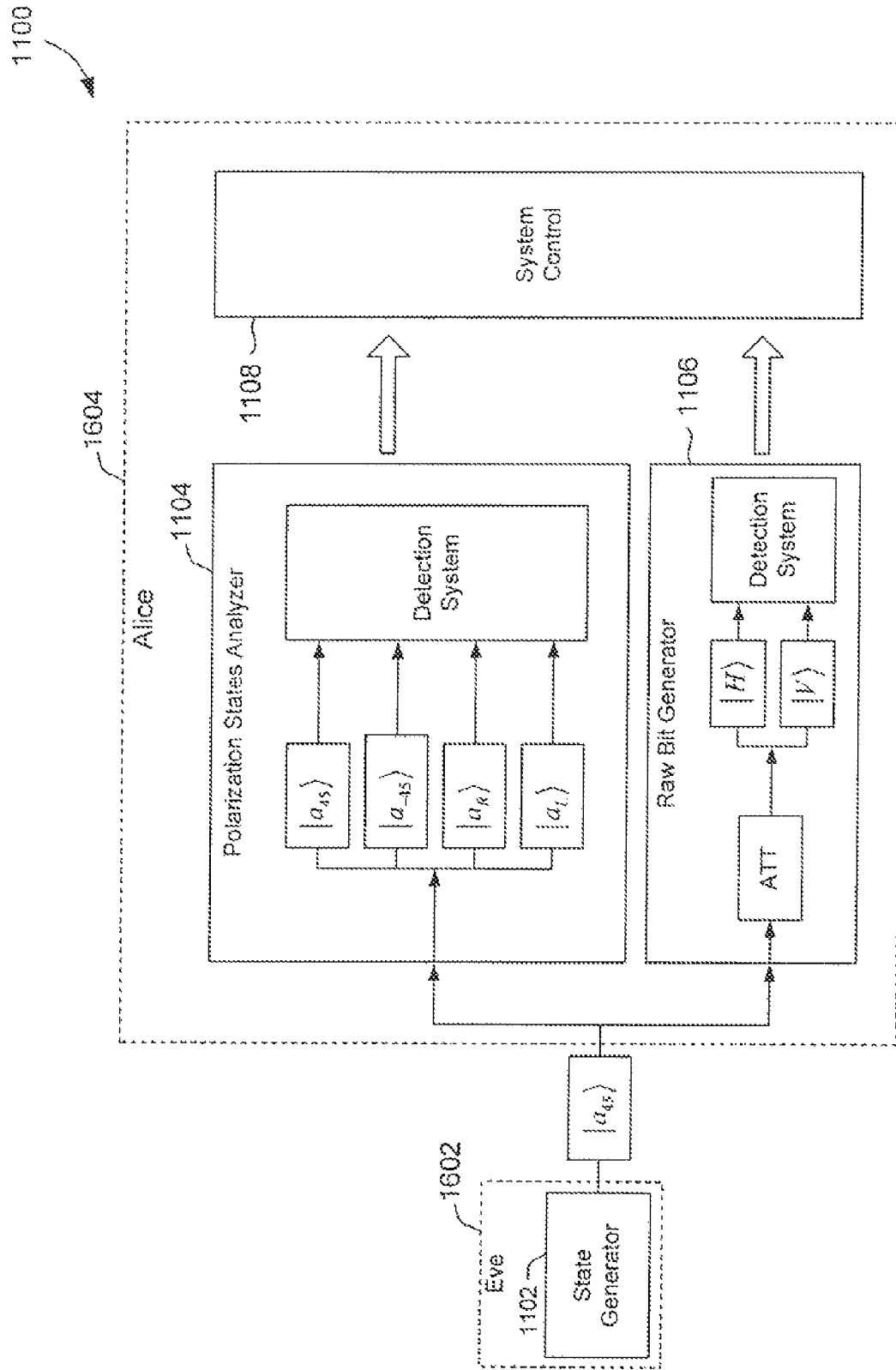
FIG. 16 illustrates the quantum random number generator shown in FIG. 11 under an adversarial scenario.

In order to emphasize that the methods of the present invention can be used to generate a sequence of true random numbers in spite of biases in the states output from the state generator 1102, the quantum mechanical-based method embodiments of the present invention are described below with reference to generating a sequence of random binary numbers $\bar{s}_m$ using an adversarial scenario. FIG. 16 illustrates the QRNG 1100 described above with reference to FIG. 11 under an adversarial scenario. In the adversarial scenario, the state generator 1102 falls under the control of an adversary, called "Eve" 1602, and the rest of the QRNG 1100 is under the control of a user, called "Alice" 1604. Eve wants to generate a sequence of binary numbers that appears random to Alice 1604, and is partially known to Eve. Because Alice generates the random binary numbers using only the states $|H\rangle$ and $|V\rangle$, the following analysis is restricted to a subspace spanned by the basis $\{|H\rangle|V\rangle\}$. Therefore it assumed that Eve generates coherent states of the form:

$$|\psi\rangle = c|H\rangle + d|V\rangle$$

where $|c|^2 + |d|^2 = 1,$ $0 \leq |c|^2 \leq 1,$ and $0 \leq |d|^2 \leq 1$

Eve is assumed to have no knowledge of the measurements Alice applies to photons in the state $|\psi\rangle$. When Eve prepares pulses, all in the same pure state $|\psi\rangle$, Alice can perform a measurement on each pulse and obtain the density matrix:

$$\hat{\rho} = \begin{bmatrix} |c|^2 & cd^* \\ c^*d & |d|^2 \end{bmatrix}$$

The density matrix $\hat{\rho}$ represents the maximum amount of information that Alice can obtain about the state of the pulses Alice is provided by Eve. Alice can determine the elements of the density matrix $\hat{\rho}$ by performing tomographic analysis on pulses provided by Eve. The tomographic analysis is used to evaluate the randomness of a sequence of binary numbers and is also referred to as "self-authentication." Tomographic analysis of quantum states is well-known in the art and is described, for example, in a reference by James et al., "Measurement of Qubits," *Phys. Rev. A*, Vol. 64, 052312. Tomographic analysis is used to identify the states $|\psi\rangle$ prepared by Eve. As described in the James et al. reference, tomographic analysis for a b-qubit system typically requires $(4^b-1)$ different expectation values to determine the density matrix $\hat{\rho}$. As a result, numerous copies of identical states are needed for measurements of the expectation values. The $(4^b-1)$ different expectation values and the normalization requirement for the states ideally generates $4^b$ independent restrictions on $2^b$ complex coefficients of a general b-qubit system, permitting an analytic solution for the density matrix $\hat{\rho}$ and $2^b$ complex coefficients defining the measured state.

Eve may also attempt to bias a sequence in a way that is known to her but appears random to Alice by transmitting pulses in a statistical mixture of the states $|\psi_i\rangle (=c_i|H\rangle+d_i|V\rangle)$, the state of each pulse having an associated probability $p_i$. Alice performs tomographic analysis to determine the density matrix operator:

$$\hat{\rho} = \sum_i p_i |\psi_i\rangle\langle\psi_i|$$

and the associated density matrix:

$$\hat{\rho} = \begin{bmatrix} \sum_i p_i |c_i|^2 & \sum_i p_i c_i d_i^* \\ \sum_i p_i c_i^* d_i & \sum_i p_i |d_i|^2 \end{bmatrix}$$

where $$\sum_i p_i |c_i|^2 = Pr_H$$

is the probability of measuring the state $|H\rangle$; and $$\sum_i p_i |d_i|^2 = Pr_V$$

is the probability of measuring the state $|V\rangle$.

The density matrix operator and the density matrix are compositions of pure state density matrix operators and associated density matrices. Note that although Eve prepares and knows the state $|\psi_i\rangle$ of each pulse that Alice is measuring each time, Eve cannot control the outcome of Alice's measurement on a state $|\psi_i\rangle$, because the outcome of each measurement performed by Alice is governed by the laws of quantum mechanics.

Alice performs the tomographic analysis to determine the density matrix $\hat{\rho}$ and to evaluate the quality of a source of randomness. The quality of a source of randomness can be strictly evaluated using a minimum entropy ("min-entropy") function defined as follows:

$$H_{Min}(X) \equiv -\log_2 \left( \max_{x \in X} Pr(x) \right)$$

where
 X is a random variable;
 Pr(x) is the probability of a event x; and $$\max_{x \in X} Pr(x)$$

means the maximum probability Pr(x) over every event x in X.

Figure 17:
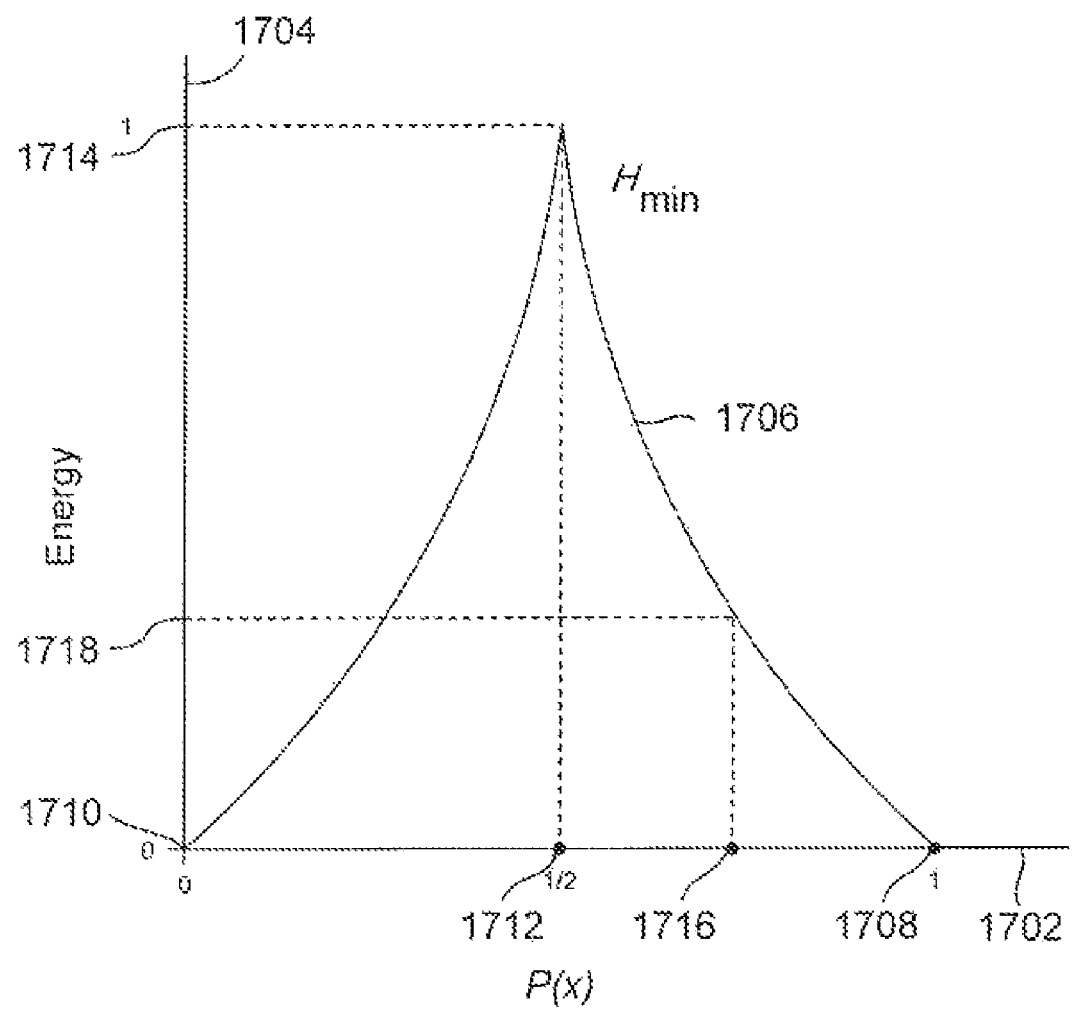
FIG. 17 is a plot of a min-entropy that represents an embodiment of the present invention.

In other words, the min-entropy can be thought of as a measure of the amount of randomness in a probability distribution. FIG. 17 is a plot of the min-entropy that represents an embodiment of the present invention. In FIG. 17, horizontal axis 1702 corresponds to the probability Pr(x) of an event x, vertical axis 1704 represents values of the min-entropy, and curve 1706 represents the min-entropy $H_{Min}(X)$. When the maximum probability Pr(x) of the event x occurring is "1" 1708, the min-entropy is "0" 1710. In other words, a min-entropy of zero means that the event x occurs with certainty and is completely deterministic. When the maximum probability Pr(x) of the event x occurring is "1/2" 1712, the min-entropy is "1" 1714. In other words, a min-entropy of "1" 1714 means that the event x occurs without bias and corresponds to a truly random event. When the maximum probability of the event x occurring is greater than 1/2, the min-entropy is between "0" and "1" and is said to be a biased event, such as such as the point 1716, which corresponds to the point 1718.

In order to demonstrate use of the min-entropy, the following discussion describes how the elements of the density matrix are used in the definition of the min-entropy for three different kinds of ensembles of states generated by Eve.

When Alice performs tomographic analysis on a single pulse in a pure state $|\psi\rangle$ provide by Eve, the random variable X is distributed over the set $\{0, 1\}$, and the min-entropy is:

$$H_{Min}(|\psi\rangle\langle\psi|) = -\log_2(\max(Pr_H(|\psi\rangle), Pr_V(|\psi\rangle)))$$

where $$Pr_H(|\psi\rangle) = |c|^2 = |\langle H|\psi\rangle|^2, \text{ and}$$

$$Pr_V(|\psi\rangle) = |d|^2 = |\langle V|\psi\rangle|^2$$

The min-entropy can be extended to the case when Alice performs tomographic analysis on n pulses, all in the same pure state $|\psi\rangle$, provided by Eve. The random variable X is distributed over the set $\{0, 1\}^n$, and the min-entropy is:

$$H_{Min}((|\psi\rangle\langle\psi|)^n) = -n \log_2(\max(Pr_H(|\psi\rangle), Pr_V(|\psi\rangle)))$$

Finally, when Alice performs tomographic analysis on n pulses in a statistical mixture of pure states $|\psi_i\rangle$ provided by Eve, the min-entropy is:

$$H_{Min}\left( \left( \sum_i p_i |\psi_i\rangle\langle\psi_i| \right)^n \right) = -n \sum_i p_i \log_2(\max(Pr_H(|\psi_i\rangle), Pr_V(|\psi_i\rangle)))$$

where $$Pr_H(|\psi_i\rangle) = \sum_i p_i |c_i|^2, \text{ and}$$

$$Pr_V(|\psi_i\rangle) = \sum_i p_i |d_i|^2$$

Alice does not know the decomposition of the states of the pulse Eve is providing. Alice only has access to the density matrix $\hat{\rho}$ that she generates during tomographic analysis. In order to obtain an extension of the min-entropy to arbitrary states, the min-entropy associated with pulses is defined as the minimum min-entropy over all the possible decompositions of the density matrix $\hat{\rho}$. Using such a definition of the minimum min-entropy places an upper bound on the amount of information Eve can obtain about Alice's sequence.

Note that as long as the min-entropy $H_{Min}$ is not equal zero, Eve does not have complete control over the sequences of binary numbers produced by the QRNGs described above. In other words, as long as the min-entropy is greater than zero, there exists some number m of random binary numbers within a sequence of n binary numbers generated by the QRNGs, where m<n.

In order to facilitate the tomographic analysis, the min-entropy $H_{Min}(\hat{\rho})$ is re-characterized as a function of the Stokes parameters. First, the 2×2 density matrix $\hat{\rho}$ associated with a statistical mixture of states $|\psi_i\rangle$ above can be rewritten in terms of the Stokes parameters $(S_0, S_1, S_2, S_3)$ as follows:

$$\hat{\rho}_S = \frac{1}{2} \sum_{i=0}^{3} \frac{S_i}{S_0} \sigma_i = \frac{1}{2} \begin{bmatrix} 1+S_1 & S_2 + iS_3 \\ S_2 - iS_3 & 1-S_1 \end{bmatrix}$$

where
 subscript "S" identifies the density matrix rewritten in terms of the Stokes parameters;
 the Stokes parameter $S_0$ is normalized to "1"; and
 $\sigma_1$, $\sigma_2$, and $\sigma_3$ are the well-known Pauli matrices the basis $\{|R\rangle, |L\rangle\}$.

The Stokes parameters of the density matrix $\hat{\rho}_S$ can be determined based on the detection events as follows. In the device embodiments of the present invention described above with reference to FIGS. 11-14, Alice use the SPCMs 1230, 1420, and 1421, shown in FIGS. 12-14, to detect single photons. The system control 1108 receives signals from the SPCMs corresponding to each detection event and calculates the average number of horizontally polarized photons, $\langle H \rangle$, and the average number of vertically polarized photons, $\langle V \rangle$. Alice uses the photodiodes 1214-1217 and 1416-1419 and the quadrant photodiode 1308 to detect the intensities of electromagnetic radiation $I(\alpha_{45})$, $I(\alpha_{-45})$, $I(\alpha_R)$, and $I(\alpha_L)$. The system control 1108 receives signals corresponding to the intensities and calculates the corresponding average intensities $\langle \alpha_{45} \rangle, \langle \alpha_{-45} \rangle, \langle \alpha_R \rangle,$ and $\langle \alpha_L \rangle$. The normalized Stokes parameters can then be determined by:

$$S_1 = \frac{\langle H \rangle - \langle V \rangle}{\langle H \rangle + \langle V \rangle},$$

$$S_2 = \frac{\langle \alpha_{45} \rangle - \langle \alpha_{-45} \rangle}{\langle \alpha_{45} \rangle + \langle \alpha_{-45} \rangle}, \text{ and}$$

$$S_3 = \frac{\langle \alpha_R \rangle - \langle \alpha_L \rangle}{\langle \alpha_R \rangle + \langle \alpha_L \rangle}$$

By defining the following real-valued function for all density matrices $\hat{\rho}_S$:

$$f(\hat{\rho}_S) = -\log_2\left(\frac{1 + \sqrt{1 - |S_1 + iS_2|^2}}{2}\right)$$

the following theorem can be stated:

Theorem 1. The min-entropy of a system described by a density matrix $\hat{\rho}_S$ is $$H_{Min}(\hat{\rho}_S) = f(\hat{\rho}_S)$$

Proof of the Theorem 1 is provided below in an appendix. The Theorem 1 demonstrates that a measurement of the density matrix of the states used to generate a sequence of binary numbers has an upper bound on the amount of information an adversary, such as Eve, can obtain. The Barak et al. reference shows that given a sequence of n binary numbers with a min-entropy $H_{Min}$, one can extract m random binary numbers from the raw sequence of binary numbers, where m<n. The m random binary numbers are distributed according to a distribution, which is arbitrarily close to a uniform distribution of binary numbers.

Figure 18:
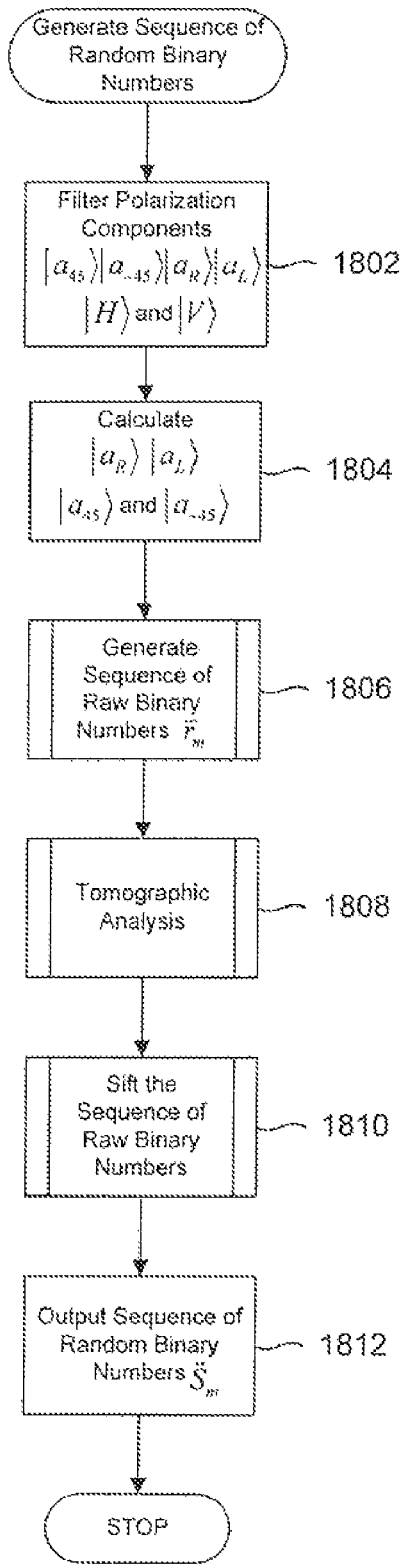
FIG. 18 shows a control-flow diagram that represents one of many embodiments of the present invention for generating sequences of random binary numbers.

FIG. 18 shows a control-flow diagram that represents one of many embodiments of the present invention for generating sequences of random binary numbers. In step 1802, the QRNGs 1100, 1200, 1300, 1400 described above are employed N times to filter the polarization components $|\alpha_{45}\rangle, |\alpha_{-45}\rangle, |\alpha_R\rangle,$ and $|\alpha_L\rangle$, and generate and filter single photons in the polarization states $|H\rangle$, and $|V\rangle$. In step 1804, based on the detection results obtained in step 1802, the system control 1108 calculates the average intensities $\langle \alpha_{45} \rangle, \langle \alpha_{-45} \rangle, \langle \alpha_R \rangle,$ and $\langle \alpha_L \rangle$, which are used to determine the Stokes parameters $S_2$ and $S_3$, as described above. In step 1806, the routine "generate a sequence of raw binary numbers" is called, which generates a raw sequence of n random binary numbers $\bar{r}_n$ from a sequence of N raw counts, as described above with reference to FIG. 15. In step 1808, the routine "tomographic analysis" is called. The routine tomographic analysis is a method for determining a density matrix $\hat{\rho}_S$ and the min-entropy $H_{Min}(\hat{\rho}_S)$, as described above. In step 1810, the routine "sift the sequence of raw binary numbers" is called, which employs the min-entropy $H_{Min}$, to remove bias from the sequence $\bar{r}_n$ and produce a smaller sequence of m random binary numbers $\bar{s}_m$. In step 1812, the sequence of random binary numbers $\bar{s}_m$ is output.

Figure 19:
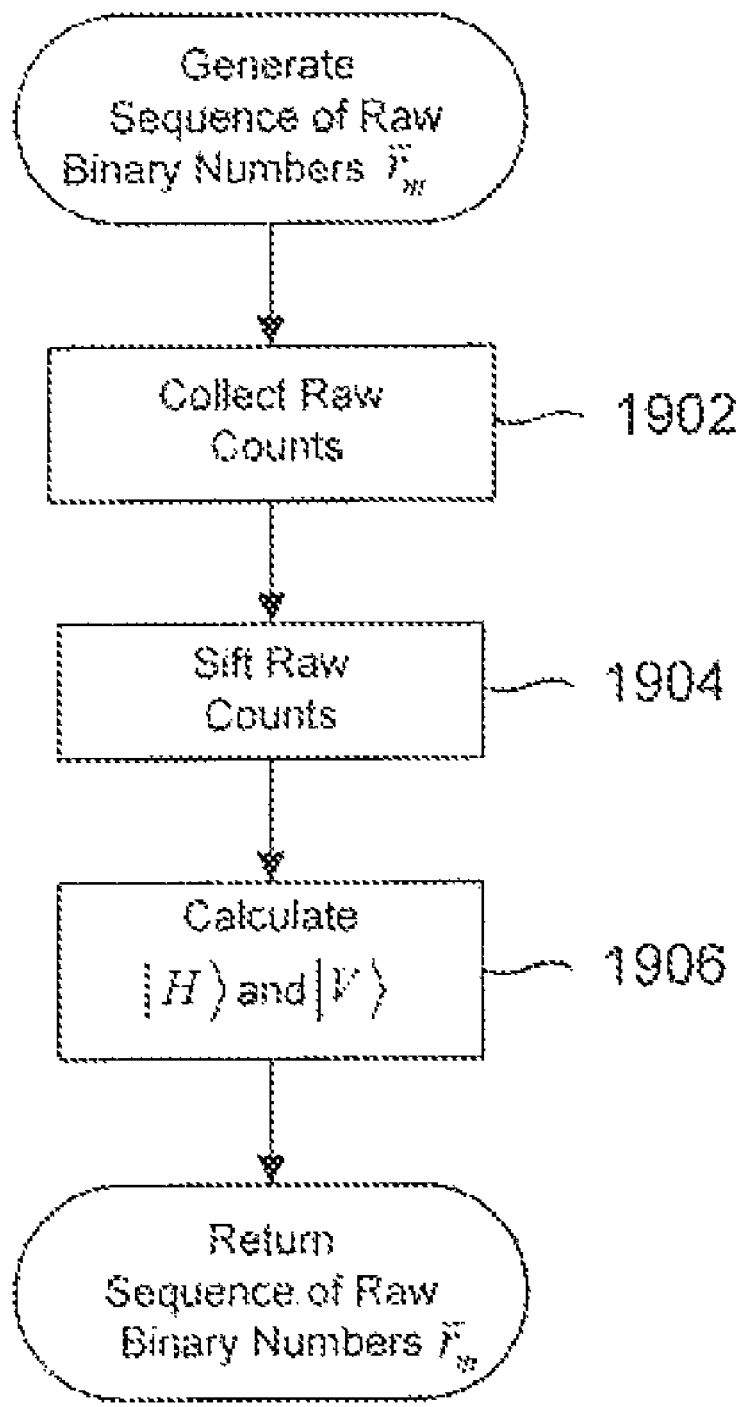
FIG. 19 shows a control-flow diagram for the routine "generate a sequence of raw binary numbers" called in step 1808 of FIG. 18 and represents one of many embodiments of the present invention.

FIG. 19 shows a control-flow diagram for the routine "generate a sequence of raw binary numbers" called in step 1808 of FIG. 18 and represents one of many embodiments of the present invention. In step 1902, M raw counts are collected as described above with reference to FIG. 12C. In step 1904, the raw count is sifted by discarding the raw counts that correspond to either "No Photons" or "Errors" leaving a raw sequence of n random binary numbers, as described above with reference to FIG. 15. In step 1906, the system control 1108 averages of the raw counts corresponding to the states $|H\rangle$ and $|V\rangle$ in order to obtain determine the averages $\langle H \rangle$ and $\langle V \rangle$, which are subsequently used to determine the Stokes parameter $S_1$, as described above.

Figure 20:
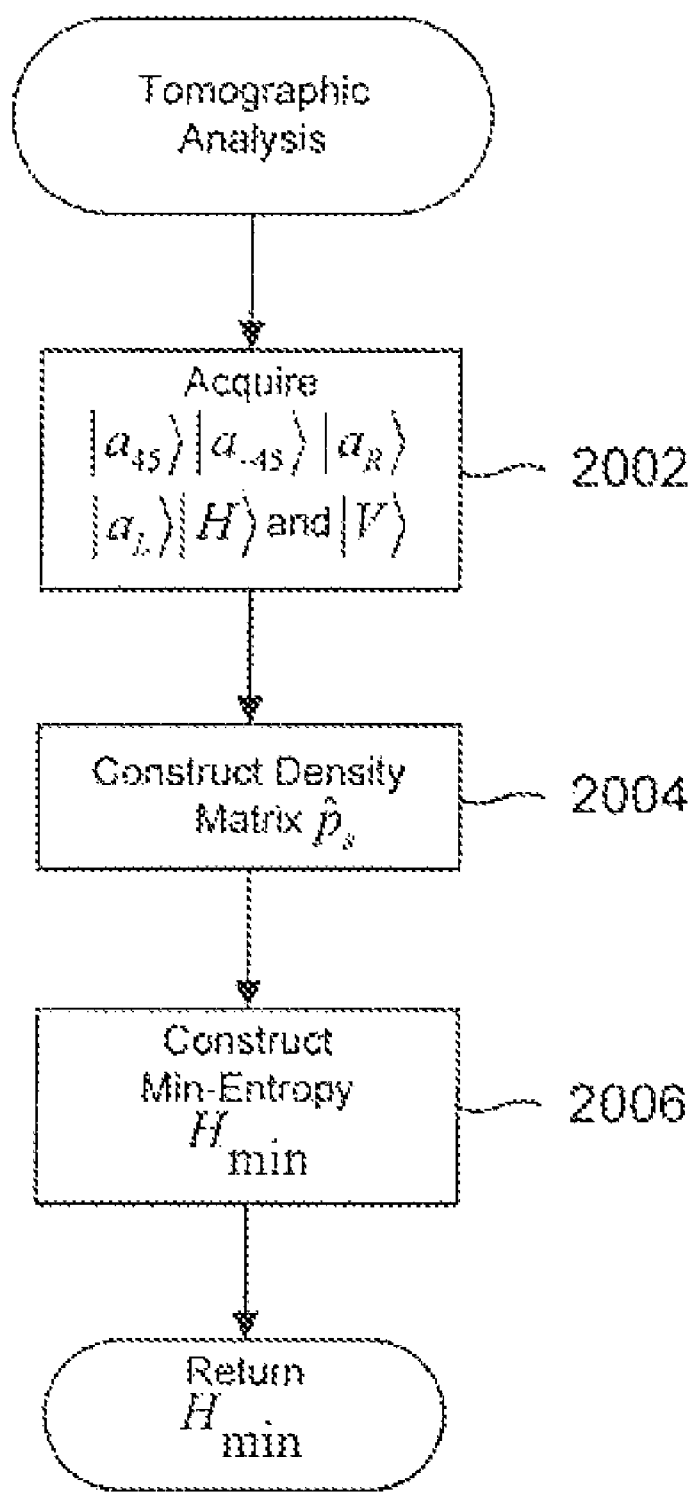
FIG. 20 shows a control-flow diagram for the routine "tomographic analysis" called in step 1806 of FIG. 18 and represents one of many embodiments of the present invention.

FIG. 20 shows a control-flow diagram for the routine "tomographic analysis" called in step 1806 of FIG. 18 and represents one of many embodiments of the present invention. In step 2002, the averages $\langle \alpha_{45} \rangle, \langle \alpha_{-45} \rangle, \langle \alpha_R \rangle, \langle \alpha_L \rangle$, obtained in step 1804 of FIG. 18, and the averages $\langle H \rangle$ and $\langle V \rangle$, obtained in step 1904 of FIG. 19, are acquired. In step 2004, the density matrix $\hat{\rho}_S$ is constructed as described above. In step 2006, the density matrix $\hat{\rho}_S$ is used to construct the min-entropy $H_{Min}(\hat{\rho}_S)$.

Figure 21:
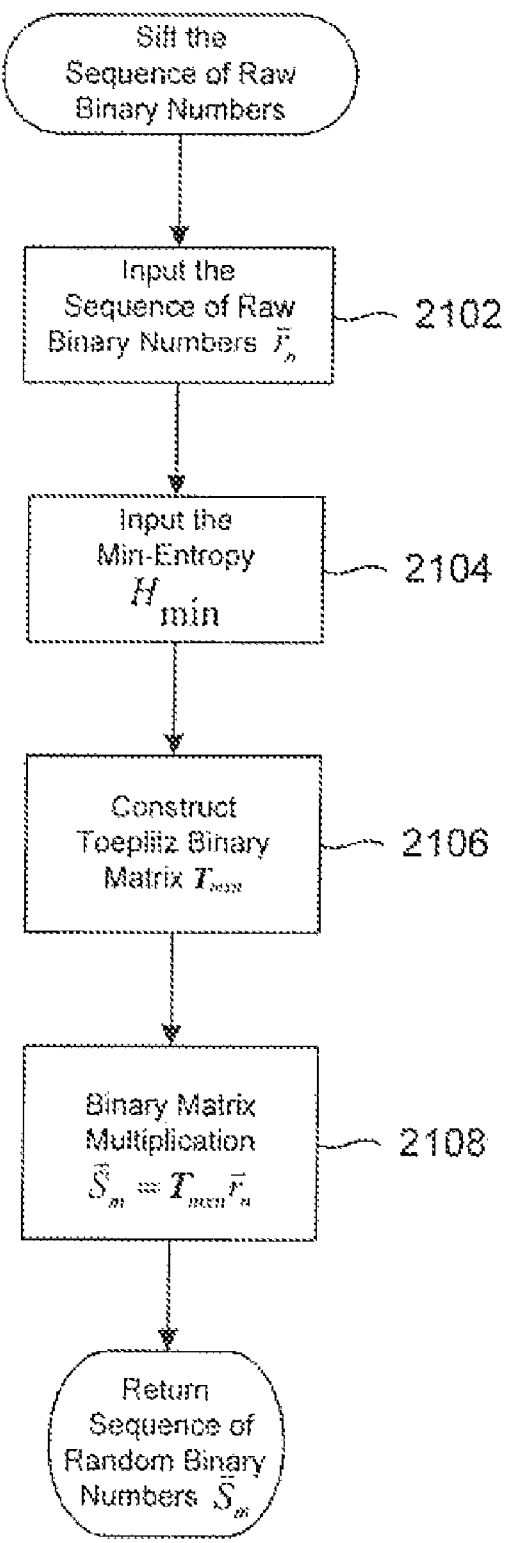
FIG. 21 is a control-flow diagram for the routine "sift the sequence of raw binary numbers" called in step 1810 of FIG. 18 and represents one of many embodiments of the present invention.

FIG. 21 is a control-flow diagram for the routine "sift the sequence of raw binary numbers" called in step 1810 of FIG. 18 and represents one of many embodiments of the present invention. In step 2102, the raw sequence of random binary numbers $\bar{r}_n$ generated by the routine "generate a raw sequence" in FIG. 20 is input. In step 2104, the min-entropy $H_{Min}(\hat{\rho}_S)$ generated in the routine "tomographic analysis" of FIG. 20 is input. In step 2106, the Toeplitz matrix $T_{n \times m}$ is constructed, as described in the Barak et al. reference. In step 2108, a sequence $\bar{s}_m$ is determined and output in step, as described above with reference to FIG. 15.

Based on the Barak et al. reference, the maximum number of binary numbers that can be extracted from a raw sequence of n random binary numbers is:

$$m = kn - 4\log_2\left(\frac{1}{\varepsilon}\right) - 2$$

where $\varepsilon$ is a statistical distance between a distribution of m binary numbers and a uniform distribution. The statistical distance is defined mathematically as:

$$\varepsilon = \frac{1}{2}\sum_a |Pr(X = a) - Pr(W = a)|$$

where X and W denote different distributions. The yield Y is the fraction of random binary numbers m/n that can be obtained from a raw sequence of random binary numbers. To test the method for extracting a sequence of random binary numbers $\bar{s}_m$, a sequence of n=3200 raw binary numbers generated by the QRNG 1100 was produced using a statistical distance of $\varepsilon = 2^{-35}$ and min-entropy of 0.38. The yield obtained was 0.33. The statistical distance and number of raw binary numbers can be changed by the QRNG 1100 operator to accommodate different security needs and computational resources.

Although the present invention has been described in terms of particular embodiments, it is not intended that the invention be limited to these embodiments. Modifications within the spirit of the invention will be apparent to those skilled in the art. In an alternate embodiment of the present invention, those skilled in the art would recognize that other optical quantum systems, the optical fibers employed to implement the PSA 1104, shown in FIG. 12-14, can be replaced with optical fibers. In alternate embodiments of the present, those skilled in the art would recognize that the QRNG embodiments shown in FIGS. 11-14 can be integrated as random number generators in larger scale electronic computing devices, such as in electronic and quantum computing devices. In alternate embodiments of the present invention, states other than coherent states, such as thermal states, can be used. For example, the state generator 1102 may be a light bulb or a light-emitting diode. In an alternate embodiment of the present invention, polarization states other than the polarization states $|H\rangle$, $|V\rangle$, $|\alpha_{45}\rangle$, $|\alpha_{-45}\rangle$, $|\alpha_R\rangle$, and $|\alpha_L\rangle$ can be used, such the polarization states described in the James et al. reference.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

APPENDIX

Theorem 1. The min-entropy of a system described by a density matrix $\hat{\rho}_S$ is:

$$H_{Min}(\hat{\rho}_S) = f(\hat{\rho}_S)$$

In order to demonstrate a proof of the Theorem 1, proofs of the followings three Lemmas are demonstrated.

Lemma 1. For each pure state $|\psi\rangle$:

$$H_{Min}(|\psi\rangle\langle\psi|) = f(|\psi\rangle\langle\psi|)$$

Proof of Lemma 1 is demonstrated by showing that:

$$\max(Pr_H, Pr_V) = \frac{1 + \sqrt{1 - |S_1 + iS_2|^2}}{2}$$

for the cases $Pr_H > \frac{1}{2}$, $Pr_H < \frac{1}{2}$, and $Pr_V = \frac{1}{2}$. First, because $|\psi\rangle$ is a pure state, the associated Stokes parameters correspond to a point on the surface of a Poincare sphere, as described above with reference to FIG. 10, and, in particular, the parameters $S_1$ and $S_2$ are given by:

$$S_1 = \sqrt{4P_H(1-P_H)}\cos 2\psi$$
$$S_2 = \sqrt{4P_H(1-P_H)}\sin 2\psi$$

Substituting $S_1$ and $S_2$ into the right-hand side gives:

$$\frac{1 + \sqrt{1 - |S_1 + iS_2|^2}}{2} = \frac{1 + \sqrt{1 - 4Pr_H(1-Pr_H)}}{2} = \frac{1}{2} + \left|\frac{1}{2} - Pr_H\right|$$

When $Pr_H > \frac{1}{2}$ the left-hand side reduces to $$\max(Pr_H, 1-Pr_H) = Pr_H,$$

and the right-hand side reduces to $$\frac{1}{2} + \left|\frac{1}{2} - Pr_H\right| = \frac{1}{2} + Pr_H - \frac{1}{2} = Pr_H$$

When $Pr_H < \frac{1}{2}$ the left-hand side reduces to $$\max(Pr_H, 1-Pr_H) = 1-Pr_H$$

and the right-hand side reduces to $$\frac{1}{2} + \left|\frac{1}{2} - Pr_H\right| = \frac{1}{2} + \frac{1}{2} - Pr_H = 1 - Pr_H$$

Finally, for the trivial case, when $Pr_{HV} = \frac{1}{2}$, both the left and right hand side reduce to $\frac{1}{2}$.

Lemma 2. Two pure states $|\psi_1\rangle$ and $|\psi_2\rangle$ that are represented by the density matrices:

$$\hat{\rho}_1 = \frac{1}{2}\begin{bmatrix} 1+S'_3 & S_1 - iS_2 \\ S_1 + iS_2 & 1-S'_3 \end{bmatrix}, \text{ and}$$

$$\hat{\rho}_2 = \frac{1}{2}\begin{bmatrix} 1-S'_3 & S_1 - iS_2 \\ S_1 + iS_2 & 1+S'_3 \end{bmatrix}$$

with $$S'_3 = \sqrt{1 - S_1^2 - S_2^2}$$

are a decomposition of the density matrix $$\hat{\rho}_S = \frac{1}{2}\begin{bmatrix} 1+S_3 & S_1 - iS_2 \\ S_1 + iS_2 & 1-S_3 \end{bmatrix}$$

Proof of Lemma 2: The density matrices represent pure states that are a decomposition of $\hat{\rho}_S$ with diagonal matrix elements that satisfy:

$$p_1 + p_2 = 1, \text{ and}$$

$$p_1 - p_2 = \frac{S_3}{S'_3}$$

Based on Lemma 1, since both $|\psi_1\rangle$ and $|\psi_2\rangle$ are pure states:

$$H_{Min}(|\psi_1\rangle\langle\psi_1|) = f(\hat{\rho}_S) = H_{Min}(|\psi_2\rangle\langle\psi_2|)$$

In addition, based on the equation for $$H_{Min}\left(\left(\sum_i p_i |\psi_i\rangle\langle\psi_i|\right)^n\right)$$

above, with n=1:

$$H_{Min}(p_1|\psi_1\rangle\langle\psi_1| + p_2|\psi_2\rangle\langle\psi_2|) = p_1 H_{Min}(|\psi_1\rangle\langle\psi_1|) +$$
$$p_2 H_{Min}(|\psi_2\rangle\langle\psi_2|) = (p_1 + p_2) f(\hat{\rho}_S) = f(\hat{\rho}_S)$$

Lemma 3. The function $f(\hat{\rho}_S)$ is a convex function of the Stokes parameters $S_1, S_2, S_3$ on the Poincare sphere.

Proof of Lemma 3: The eigenvalues of the Hessian matrix of $f(\hat{\rho}_S)$ are non-negative over the domain (½, 1).

Proof of the Theorem. According to properties of a convex function:

$$f(\hat{\rho}_S) \leq \sum_i p_i f(|\psi_i\rangle\langle\psi_i|)$$

for each decomposition of $\hat{\rho}_S$. Substituting the result of Lemma 1 and using equation $$H_{Min}\left(\left(\sum_i p_i |\psi_i\rangle\langle\psi_i|\right)^n\right)$$

above gives:

$$f(\hat{\rho}_S) \leq H_{Min}\left(\sum_i p_i |\psi_i\rangle\langle\psi_i|\right)$$

Which means that $f(\hat{\rho}_S)$ is a lower bound for the min-entropy of $\hat{\rho}_S$. But according to Lemma 2, there is at least one decomposition of $\hat{\rho}_S$ for which $$f(\hat{\rho}_S) = H_{Min}(\hat{\rho}_S)$$

Therefore, $f(\hat{\rho}_S)$ is equal to the minimum of $H_{Min}$ over all the decompositions of $\hat{\rho}_S$. Q.E.D.

What is claimed is:

1. An optical-based, self-authenticating random number generator comprising:
   a state generator configured to generate a quantum system in a coherent state;
   a polarization states analyzer configured to project the quantum system onto one of four different polarization states, and detect each of the four different polarization states;
   a raw bit generator configured to convert the quantum system into a single photon and detect the single photon in either a first polarization state that corresponds to a first binary number or a second polarization state that corresponds to a second binary number; and
   a system control configured to receive signals from the polarization states analyzer and the raw bit generator, the signals corresponding to the polarization states, and output a random number based on the first and second polarization states of the single photon.

2. The system of claim 1 wherein the state generator further comprises one of:
   a laser diode;
   a light bulb; and
   a light-emitting diode.

3. The system of claim 1 wherein the quantum system further comprises a pulse of electromagnetic radiation.

4. The system of claim 1 wherein the polarization states analyzer further comprises:
   a first beamsplitter configured to split the quantum system into a first reflected quantum system and a first transmitted quantum system, the first reflected and the first transmitted quantum systems both in a first polarization state;
   a second beamsplitter configured to split the first transmitted quantum system into a second reflected quantum system and a second transmitted quantum system, the second reflected and the second transmitted quantum systems both in the first polarization state and the second transmitted quantum system directed to the raw bit generator;
   a half-wave plate configured to receive the first reflected quantum system in the first polarization state and output the first reflected quantum system in a second polarization state;
   a quarter-wave plate configure to receive the second reflected quantum system in the first polarization state and output the second reflected quantum system in a third polarization state;
   a first polarization beamsplitter configured to split the first reflected quantum system into a first horizontally polarized quantum system and a first vertically polarized quantum system;
   a second polarization beamsplitter configured to split the second reflected quantum system into a second horizontally polarized quantum system and a second vertically polarized quantum system; and
   four photodiode detectors, each photodiode detector configured to detect one of the horizontally and vertically polarized quantum systems.

5. The system of claim 1 wherein the polarization states analyzer further comprises:
   a beamsplitter configured to split the quantum system into a reflected quantum system and a transmitted quantum system, the reflected and the transmitted quantum systems both in a first polarization state and the transmitted quantum system directed to the raw bit generator;
   a concave lens configured to receive the reflected quantum system and output a divergent quantum system;

a quadrant polarization filter configured to receive the divergent quantum system and output four quantum systems, each of the four quantum systems in one of four polarization states; and a quadrant photodiode detector configured to separately detect each of the four quantum systems in the four polarization states.

6. The system of claim 1 wherein the raw bit generator further comprises:

an attenuator configured to convert the quantum system in the coherent state into either the vacuum state or the single photon, the single photon in a linear superposition of orthogonal first and second polarization states;

a polarization beamsplitter configured to transmit the single photon in the first polarization state and reflect the single photon in the second polarization state;

a delay fiber connected to the polarization beamsplitter and configured to transmit the single photon in the second polarization state; and a single photon counting module configured to detect the single photon in either the first polarization state or the second polarization state and output a corresponding signal to the system control.

7. The system of claim 1 wherein the signals output from the polarization states analyzer and the signals output from the raw bit generator are synchronized.

8. The random number generator of claim 1 wherein the system control receives signals output from the polarization states analyzer, each signal representing detection of one of the four different polarization states, receives signals output from the raw bit generator, each signal representing the polarization state of the single photon, and performs tomographic analysis to authenticate the randomness of the signals output from the raw bit generator.

9. An optical-based, self-authenticating random number generator comprising:

a state generator configured to generate a quantum system in a coherent state;

a beamsplitter configured to split the quantum system into a number of separate quantum systems, each of the separate quantum systems in the coherent state;

polarization filters, each polarization filter configured to project one of the number of quantum systems onto a unique polarization state;

a first attenuator configured to attenuate a first of the number of quantum systems to either a vacuum state or a single photon state and a second attenuator configured to attenuate a second of the number of quantum systems to either a vacuum state or a single photon state;

photodiodes, each photodiode configured to detect one of the number of separate quantum systems; and a system control configured to receive a signal output from each of the photodiodes, each signal representing detection of one of the number of different polarization states, and output a random binary number.

10. The system of claim 9 wherein the state generator further comprises a laser diode.

11. The system of claim 9 wherein the quantum system further comprises a continuous wave of electromagnetic radiation.

12. The system of claim 11 wherein the two avalanche photodiodes are configured to detect the first and second of the six quantum systems, and the four PIN photodiodes are configured to detect the four remaining quantum systems.

13. The system of claim 9 wherein the six photodiodes further comprise two avalanche photodiodes and four PIN photodiodes.

14. A method for generating a sequence of random binary numbers, the method comprising:

generating a quantum system in a coherent state;

splitting the quantum system into a number of separate quantum systems, each quantum system in a coherent state;

projecting each of the separate quantum systems onto one of a number of different polarization states;

detecting and storing the polarization state of each of the separate quantum systems;

repeating the steps of generating, splitting, projecting, and detecting to construct a raw sequence of binary numbers, the raw sequence of binary numbers based on the polarization states of two of the separate quantum systems; and based on the stored polarization states of each of the separate quantum systems, performing tomographic analysis in order to extract and output a sequence of random numbers from the raw sequence of binary numbers.

15. The method of claim 14 wherein splitting the quantum system into a number of separate quantum systems further comprises transmitting the quantum system through one or more beamsplitters.

16. The method of claim 14 wherein projecting each of the separate quantum systems further comprises transmitting each of the separate quantum system through a corresponding polarization filter.

17. The method of claim 14 wherein performing tomographic analysis further comprises constructing the minimum entropy:

$$H_{\text{Min}}(\hat{\rho}_S) \equiv -\log_2\left(\max_{x \in \hat{\rho}_S} Pr(x)\right)$$

where $\hat{\rho}_s$ is the density matrix for an ensemble of states $|\psi_i\rangle = c_i|H\rangle + d_i|V\rangle$ as a function of Stokes parameters;

$Pr(x)$ is the probability of a event x; and $$\max_{x \in X} Pr(x)$$

$Pr(x)$ means the maximum probability $Pr(x)$ over every event x in X.

18. The method of claim 17 wherein performing tomographic analysis further comprises constructing a Toeplitz matrix $T_{n \times m}$ based on the minimum entropy $H_{Min}(\hat{\rho}_S)$, where m is the number of random binary numbers, n is the number of raw binary numbers, and m<n.

19. The method of claim 17 wherein the density matrix further comprises:

$$\hat{\rho}_S = \frac{1}{2}\sum_{i=0}^{3} \frac{S_i}{S_0}\sigma_i = \frac{1}{2}\begin{bmatrix} 1+S_3 & S_1-iS_2 \\ S_1+iS_2 & 1-S_3 \end{bmatrix}$$

where $(S_0, S_1, S_2, S_3)$ are Stokes parameters;

the Stokes parameter $S_0$ is normalized to "1"; and $\sigma_1, \sigma_2,$ and $\sigma_3$ are the Pauli matrices.

* * * * *

UNITED STATES PATENT AND TRADEMARK OFFICE
CERTIFICATE OF CORRECTION

PATENT NO. : 7,849,121 B2  
APPLICATION NO. : 11/546158  
DATED : December 7, 2010  
INVENTOR(S) : Marco Fiorentino et al.

Page 1 of 1

It is certified that error appears in the above-identified patent and that said Letters Patent is hereby corrected as shown below:

In column 42, lines 39-40, in Claim 17, delete "$|\psi_i\rangle = c_i |H\rangle + d_1 |V\rangle$" and insert -- $|\psi_i\rangle = c_i |H\rangle + d_i |V\rangle$ --, therefor.

In column 42, line 46 (Approx.), in Claim 17, before "means" delete "Pr(x)".

Signed and Sealed this  
Nineteenth Day of April, 2011

David J. Kappos  
*Director of the United States Patent and Trademark Office*